United States Patent
Ge et al.

(10) Patent No.: US 10,873,410 B2
(45) Date of Patent: Dec. 22, 2020

(54) RECEPTION DEVICE AND METHOD OF DETECTING SUPERVISORY CONTROL SIGNAL

(71) Applicant: FUJITSU LIMITED, Kawasaki (JP)

(72) Inventors: Yi Ge, Bunkyo (JP); Takeshi Hoshida, Kawasaki (JP); Hisao Nakashima, Kawasaki (JP); Tomofumi Oyama, Kawasaki (JP); Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/900,128

(22) Filed: Feb. 20, 2018

(65) Prior Publication Data
US 2018/0248643 A1 Aug. 30, 2018

(30) Foreign Application Priority Data

Feb. 24, 2017 (JP) .................................. 2017-033918

(51) Int. Cl.
*H04B 10/079* (2013.01)
*H04B 10/077* (2013.01)
(Continued)

(52) U.S. Cl.
CPC ...... *H04J 14/0227* (2013.01); *H04B 10/0775* (2013.01); *H04B 10/07957* (2013.01);
(Continued)

(58) Field of Classification Search
None
See application file for complete search history.

(56) References Cited

U.S. PATENT DOCUMENTS

| | | | |
|---|---|---|---|
| 2003/0002098 A1* | 1/2003 | Carrick ............... | H04B 10/077 398/5 |
| 2003/0025957 A1* | 2/2003 | Jayakumar ............ | H04B 10/00 398/5 |

(Continued)

FOREIGN PATENT DOCUMENTS

| | | |
|---|---|---|
| JP | 2014-103600 | 6/2014 |
| JP | 2016-10040 | 1/2016 |

(Continued)

OTHER PUBLICATIONS

M. D. Feuer et al., "Rejection of Interlabel Crosstalk in a Digital Lightpath Labeling System With Low-Cost All-Wavelength Receivers", IEEE Journal of Lightwave Technology., vol. 24, No. 3, Mar. 2006, pp. 1121-1128 (8 pages).

(Continued)

*Primary Examiner* — Li Liu
(74) *Attorney, Agent, or Firm* — Fujitsu Patent Center

(57) ABSTRACT

There is provided a reception device including a receiver configured to receive a wavelength-multiplexed optical signal so as to generate a wavelength-multiplexed signal, a filter configured to pass through the wavelength-multiplexed signal having a specific wavelength and an adjacent wavelength to the specific wavelength from the wavelength-multiplexed signal, and a processor configured to detect a specific signal having the specific wavelength from the wavelength-multiplexed signal having the passed through wavelengths by the filter, and detect a first supervisory control signal having the specific wavelength and a second supervisory control signal having the adjacent wavelength from the wavelength-multiplexed signal having the passed through wavelengths by the filter.

7 Claims, 19 Drawing Sheets

(51) Int. Cl.
*H04B 10/572* (2013.01)
*H04J 14/02* (2006.01)
*H04B 10/556* (2013.01)
*H04B 10/66* (2013.01)
*H04B 10/61* (2013.01)
*H04B 10/548* (2013.01)

(52) U.S. Cl.
CPC ......... *H04B 10/548* (2013.01); *H04B 10/556* (2013.01); *H04B 10/572* (2013.01); *H04B 10/612* (2013.01); *H04B 10/66* (2013.01); *H04J 14/0212* (2013.01); *H04J 14/0275* (2013.01)

(56) References Cited

U.S. PATENT DOCUMENTS

| | | | | |
|---|---|---|---|---|
| 2005/0244161 | A1* | 11/2005 | Satoh | H04J 14/0227 398/85 |
| 2005/0249505 | A1* | 11/2005 | Manderscheid | H04B 10/077 398/177 |
| 2014/0140692 | A1* | 5/2014 | Oda | H04B 10/5057 398/23 |
| 2015/0381276 | A1 | 12/2015 | Saito et al. | |
| 2016/0036533 | A1* | 2/2016 | Nakashima | G02F 1/0123 398/187 |
| 2016/0204875 | A1 | 7/2016 | Araki et al. | |

FOREIGN PATENT DOCUMENTS

| | | |
|---|---|---|
| JP | 2016-034078 | 3/2016 |
| JP | 2016-131273 | 7/2016 |

OTHER PUBLICATIONS

M. D. Feuer et al., "Digital Lightpath Label Transcoding for Dual-Polarization QPSK Systems" in OFC/NFOEC 2011, JWA28, Optical Society of America, 2011 (3 pages).

JPOA-Japanese Office Action dated Oct. 20, 2020 for corresponding Japanese Patent Application No. 2017-033918 with Machine Translation.

* cited by examiner

RECEPTION DEVICE AND METHOD OF DETECTING SUPERVISORY CONTROL SIGNAL

CROSS-REFERENCE TO RELATED APPLICATION

This application is based upon and claims the benefit of priority of the prior Japanese Patent Application No. 2017-033918, filed on Feb. 24, 2017, the entire contents of which are incorporated herein by reference.

FIELD

The embodiments discussed herein are related to a reception device and a method of detecting a supervisory control signal.

BACKGROUND

In an optical transmission system, a modulation scheme which superimposes a supervisory control signal on a wavelength has been proposed. As the modulation scheme, for example, a frequency shift keying-supervisory (FSK-SV) scheme is used. In the FSK-SV scheme, for example, a transmitting device of a transponder generates a supervisory control signal which swings a predetermined wavelength as an FSK signal. When the predetermined wavelength is swung, the transmitting device shifts each bit "0" and "1" of a digital signal. Further, the transmitting device modulates a main signal to the predetermined wavelength by phase modulation, and outputs a signal obtained by superimposing the FSK signal on the wavelength. Since the FSK signal has a smaller capacity than the capacity of the main signal, communication is available even when the main signal is not communicated.

In the FSK-SV scheme, a usage application is assumed in which a control signal and the like is directly transceived between the transponders without going through a controller on a network. In the related art, communication is only available between the facing transponders in which a transmission path is established, but in the future, it is desirable to perform a communication for a second transponder adjacent to a facing first transponder. For example, when the first transponder utilizes a target wavelength, the second transponder may use an adjacent wavelength adjacent to the target wavelength.

In an optical transmission technology, a use of a technology called "super channel" is being considered for a large capacity in addition to the wavelength division multiplexer (WDM) technology. Accordingly, it is expected in the future that there would be increasing demands for collectively performing the same control on a plurality of adjacent continuous wavelengths with super channels. For example, as for a case where the same control is collectively performed on a plurality of adjacent continuous wavelengths, a case where a mismatch of the wavelengths is collectively and finely adjusted may be conceived.

Related technologies are disclosed in, for example, Japanese Laid-Open Patent Publication Nos. 2016-034078 and 2016-131273.

SUMMARY

According to an aspect of the invention, a reception device includes a receiver configured to receive a wavelength-multiplexed optical signal so as to generate a wavelength-multiplexed signal, a filter configured to pass through the wavelength-multiplexed signal having a specific wavelength and an adjacent wavelength to the specific wavelength from the wavelength-multiplexed signal, and a processor configured to detect a specific signal having the specific wavelength from the wavelength-multiplexed signal having the passed through wavelengths by the filter, and detect a first supervisory control signal having the specific wavelength and a second supervisory control signal having the adjacent wavelength from the wavelength-multiplexed signal having the passed through wavelengths by the filter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the related art, when an adjacent wavelength which is adjacent to a target wavelength is monitored as well in addition to the target wavelength, there is a case where a size (e.g., circuit size) of the receiving device is increased.

Hereinafter, an embodiment of a technology which is capable of detecting a supervisory control signal at an adjacent wavelength without increasing the circuit size will be described in detail based on the drawings. In the meantime, it is noted that the disclosed technology is not limited by the present embodiment. Further, the respective embodiments described below may be appropriately combined with each other within a range that does not cause a contradiction.

First Embodiment

Figure 1:
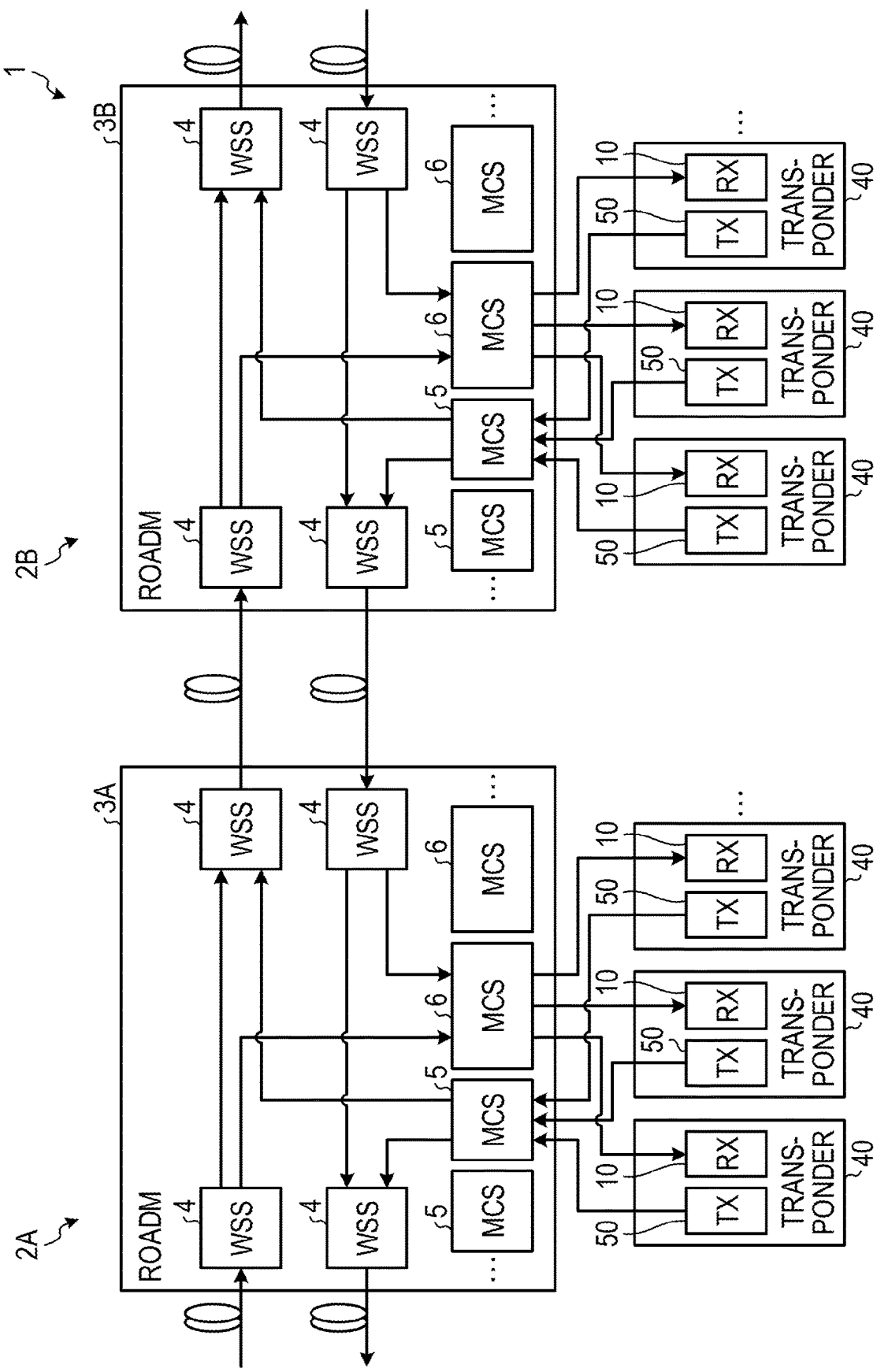
FIG. 1 is an explanatory diagram illustrating an example of an optical transmission system according to the present embodiment.

FIG. 1 is an explanatory diagram illustrating an example of an optical transmission system 1 according to the present embodiment. The optical transmission system 1 illustrated in FIG. 1 includes an optical transmitting device 2A, and an optical transmitting device 2B which is connected to be capable of optically communicating with the optical transmitting device 2A via an optical transmission path.

The optical transmitting device 2A includes a reconfigurable optical Add/Drop multiplexer (ROADM) 3A and a plurality of transponders 40. The optical transmitting device 2B includes an ROADM 3B and a plurality of transponders 40.

The ROADMs 3A and 3B are optical add/drop devices of a wavelength division multiplexer (WDM) transmitting device which multiplexes and transmits a plurality of optical signals having different wavelengths and the like. The optical add/drop device corresponds to a station, a port, a node, and the like. Each of the ROADMs 3A and 3B includes a plurality of wavelength selective switches (WSSs) 4 and a plurality of multicast switches (MCSs) 5 and 6.

Each of the plurality of transponders 40 includes a transmitting device (TX) 50 and a receiving device (RX) 10. The transmitting device 50 and the receiving device 10 are optical communication devices in a digital coherent scheme.

For example, the WSS 4 is a switch including ports including one input port×N output ports, shifting an optical signal in the unit of a wavelength and selecting the optical signal. The MCSs 5 and 6 are optical add/drop units which insert light to the optical signal or optically drops the optical signal in the unit of the wavelength. The transmitting device 50 is a line card that transmits an optical signal. The receiving device 10 is a line card that receives an optical signal.

For example, in the optical transmitting device 2A, the MCS 5 of the ROADM 3A combines an optical signal transmitted from the transmitting device 50 of the transponder 40 and transmits the combined optical signal to the optical transmitting device 2B from the WSS 4 of the ROADM 3A via the optical transmission path. In the optical transmitting device 2B, the optical signal transmitted from the optical transmitting device 2A is received by the WSS 4 of the ROADM 3B and is separated by the MCS 6 of the ROADM 3B, and the receiving device 10 of the transponder 40 receives the separated optical signal.

Figure 2:
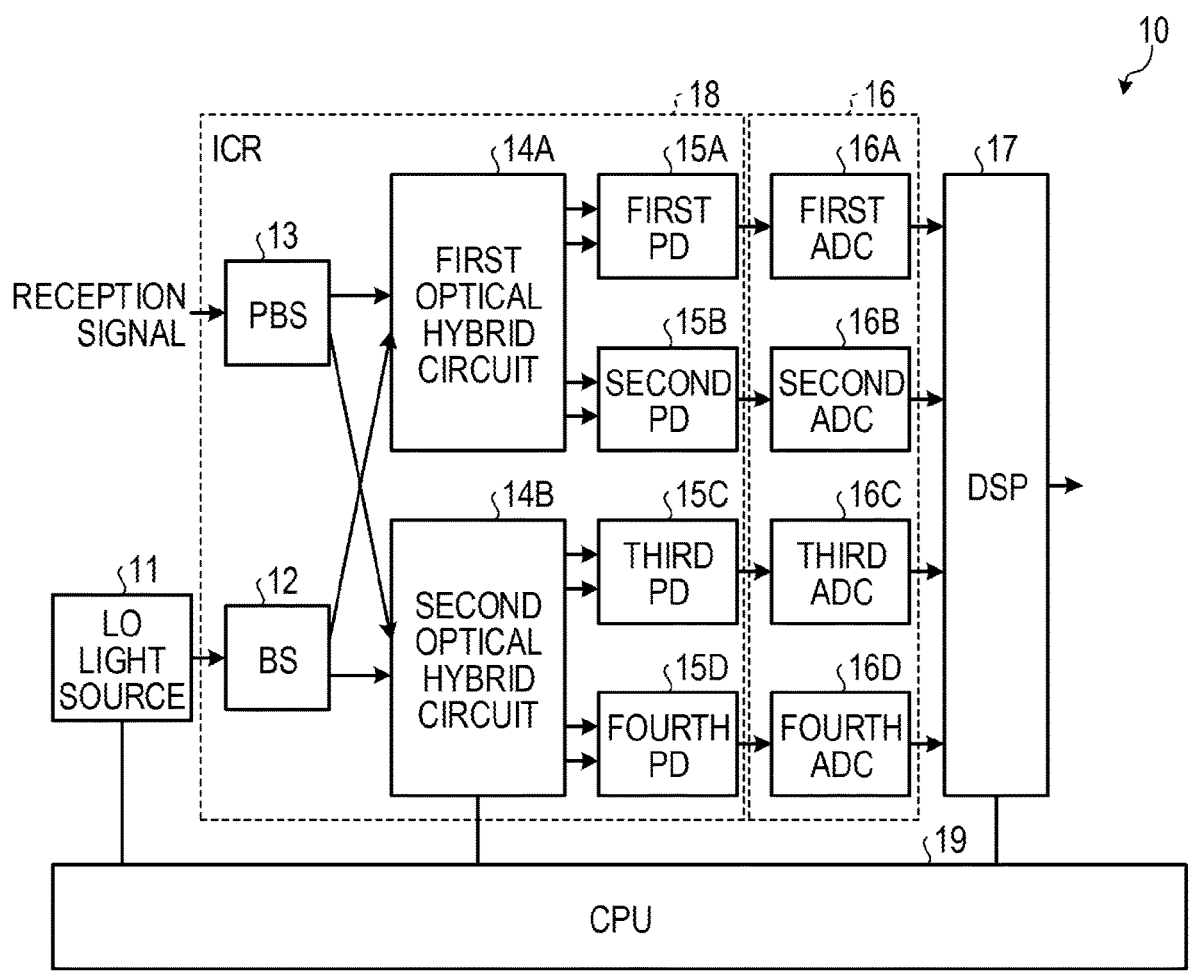
FIG. 2 is a block diagram illustrating an example of a hardware configuration of a receiving device.

FIG. 2 is a block diagram illustrating an example of a hardware configuration of the receiving device (RX) 10. The receiving device 10 includes a local laser diode (LO) light source 11, an integrated coherent receiver (ICR) 18, an analog to digital converter (ADC) 16, a digital signal processor (DSP) 17, and a central processing unit (CPU) 19. The ICR 18 includes a beam splitter (BS) 12, a polarization beam splitter (PBS) 13, first and second optical hybrid circuits 14A and 14B, and first to fourth photo diodes (PDs) 15A to 15D. The ADC 16 includes first to fourth ADCs 16A to 16D.

The LO light source 11 is, for example, laser that emits local light. The BS 12 separates local light from the LO light source 11 and outputs the separated light to the first optical hybrid circuit 14A and the second optical hybrid circuit 14B. The PBS 13 separates a reception signal into two orthogonal polarization states such as, for example, an X polarization component and a Y polarization component. Further, the X polarization component is a horizontal polarization component and the Y polarization component is a vertical polarization component. The PBS 13 outputs the X polarization component to the first optical hybrid circuit 14A. Further, the PBS 13 outputs the Y polarization component to the second optical hybrid circuit 14B.

The first optical hybrid circuit 14A obtains an optical signal of an I component and a Q component by making the local light interfere with the X polarization component of the reception signal. Further, the I component is an in-phase axis component and the Q component is an orthogonal axis component. The first optical hybrid circuit 14A outputs an optical signal of the I component in the X polarization component to the first PD 15A. The first optical hybrid circuit 14A outputs an optical signal of the Q component in the X polarization component to the second PD 15B.

The second optical hybrid circuit 14B obtains an optical signal of an I component and a Q component by making the local light interfere with the Y polarization component of the reception signal. The second optical hybrid circuit 14B outputs an optical signal of the I component in the Y polarization component to the third PD 15C. The second optical hybrid circuit 14B outputs an optical signal of the Q component in the Y polarization component to the fourth PD 15D.

The first PD 15A converts the optical signal of the I component of the X polarization component from the first optical hybrid circuit 14A into electric signals, adjusts the gain, and outputs the electric signals after the adjustment of the gain to the first ADC 16A. The first ADC 16A converts the electric signal of the I component of the X polarization component into digital signals and outputs the converted digital signals to the DSP 17. The second PD 15B converts the optical signal of the Q component of the X polarization component from the first optical hybrid circuit 14A into electric signals, adjusts the gain, and outputs the electric signal after the adjustment of the gain to the second ADC 16B. The second ADC 16B converts the electric signal of the Q component of the X polarization component into digital signals and outputs the converted signals to the DSP 17.

The third PD 15C converts the optical signal of the I component of the Y polarization component from the second optical hybrid circuit 14B into electric signals, adjusts the gain, and outputs the electric signals after the adjustment of the gain to the third ADC 16C. The third ADC 16C converts the electric signals of the I component of the Y polarization component into digital signals and outputs the converted signals to the DSP 17. The fourth PD 15D converts the optical signal of the Q component of the Y polarization component from the second optical hybrid circuit 14B into electric signals, adjusts the gain, and outputs the electric signals after the adjustment of the gain to the fourth ADC 16D. The fourth ADC 16D converts the electric signal of the Q component of the Y polarization component into digital signals and outputs the converted signals to the DSP 17.

The DSP 17 performs a digital signal processing on the digitally converted I component and Q component within the X polarization component and the digitally converted I component and Q component within the Y polarization component, and demodulates the X polarization component and the Y polarization component. The CPU 19 is a control unit which controls the entire receiving device 10.

Figure 3:
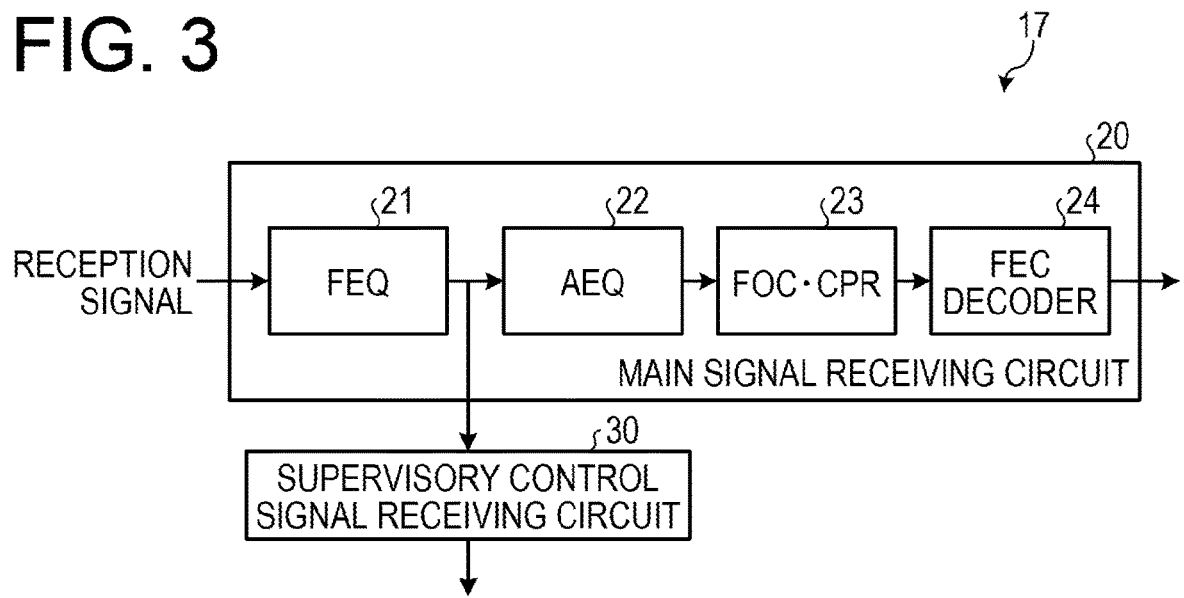
FIG. 3 is a block diagram illustrating an example of a functional configuration of a DSP within the receiving device.

FIG. 3 is a block diagram illustrating an example of a functional configuration of the DSP 17 within the receiving device 10. The DSP 17 includes a main signal receiving circuit 20 and a supervisory control signal receiving circuit 30.

The main signal receiving circuit 20 is a main signal detecting unit which receives (detects) a main signal that is a digital signal obtained by converting the electric signal into digital signals. The main signal receiving circuit 20 includes a fixed equalizer (FEQ) 21, an adaptive equalizer (AEQ) 22, a frequency offset compensator (FOC)•carrier phase recovery (CPR) 23, and a forward error correction (FEC) decoder 24.

The FEQ 21 is a wavelength dispersion compensation circuit which compensates for a wavelength dispersion generated in the optical transmission path. Further, the FEQ 21 performs, for example, a linear compensation or a non-linear compensation. For example, the AEQ 22 is an equalization circuit for polarization separation, a band compensation, a linear distortion compensation, or the like. For example, the AEQ 22 performs a polarization separation processing which adaptively follows a time variation of a polarization fluctuation or a polarization mode dispersion, a compensation processing which compensates for a residual dispersion that cannot be compensated by the wavelength dispersion compensation at a preceding stage, or a compensation processing which compensates for a signal band narrowing generated in an electric device, an optical device, or the like.

As for a function of the frequency offset compensation (FOC), the FOC•CPR 23 first estimates a difference between a frequency of the LD at the transmitting device 50 side and a frequency of the LO light source 11 at the receiving device 10 side, and compensates for the difference. Further, as for a function of the CPR (phase recovery), the FOC•CPR 23 compensates for the phase noise of the LO light source 11 or a fluctuation component of a high-speed residual frequency offset which cannot be compensated by the function of the FOC. The FEC decoder 24 performs an FEC processing on the demodulation signal compensated by the FOC•CPR 23.

The supervisory control signal receiving circuit 30 is a supervisory control signal detecting unit which receives (detects) a supervisory control signal to be described below. The supervisory control signal receiving circuit 30 receives (detects) a supervisory control signal from the signal obtained after the compensation by the FEQ 21. Otherwise, the supervisory control signal receiving circuit 30 may receive (detect) a supervisory control signal from the signal obtained before the compensation by the FEQ 21.

Figure 4:
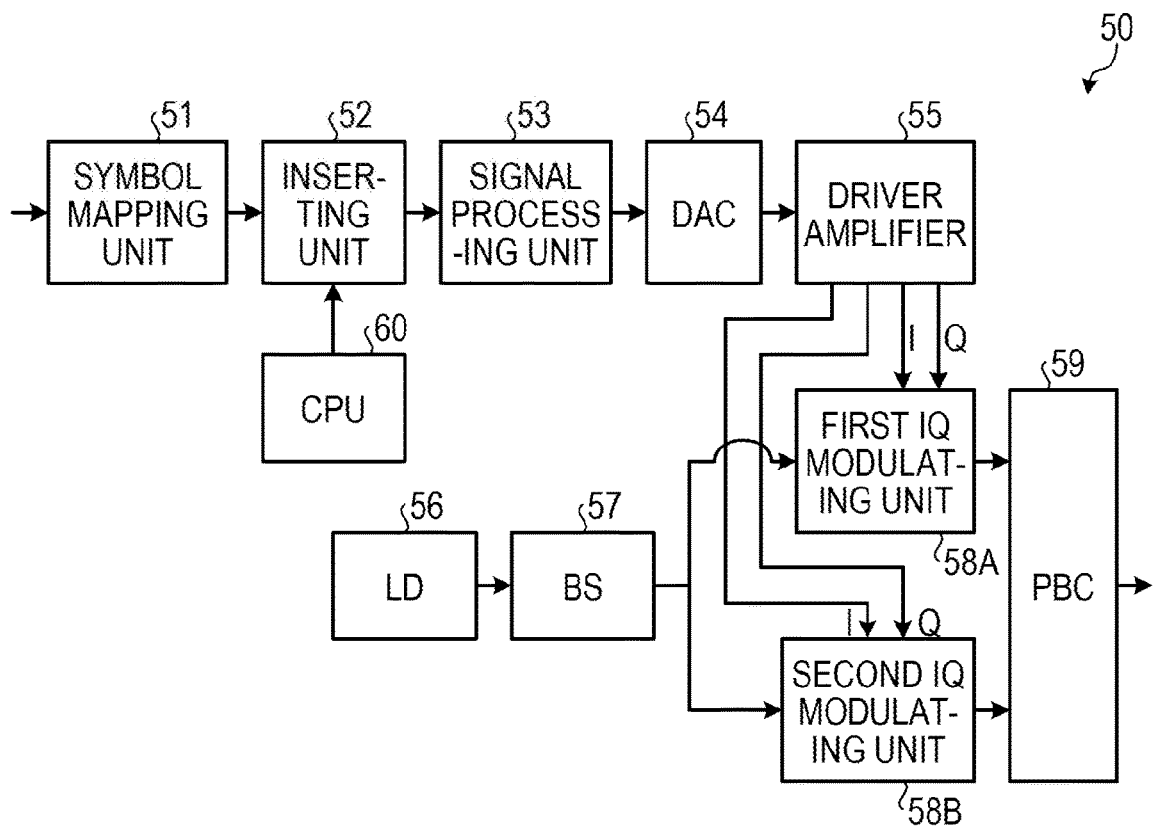
FIG. 4 is a block diagram illustrating an example of a hardware configuration of a transmitting device.

FIG. 4 is a block diagram illustrating an example of a hardware configuration of the transmitting device 50. The transmitting device 50 includes a symbol mapping unit 51, an inserting unit 52, a signal processing unit 53, a digital to analog converter (DAC) 54, a driver amplifier 55, a laser diode (LD) 56, and a beam splitter (BS) 57. Further, the transmitting device 50 includes first and second IQ modulating units 58A and 58B, a polarization beam combiner (PBC) 59, and a CPU 60.

The symbol mapping unit 51 is a processing unit which maps transmission data to a symbol. The inserting unit 52 inserts a PS between data symbols for every set period. Further, the set period and an amplitude ratio of the PS may be appropriately changed and set. It is assumed that for example, a predetermined pattern corresponding to the set period and the amplitude ratio of the PS is stored in the receiving device 10. The signal processing unit 53 performs a signal processing on a symbol column. The DAC 54 converts the symbol column to an analog signal, and outputs the converted analog signal to the driver amplifier 55.

The driver amplifier 55 outputs a driving signal according to the analog signal of the symbol column to the first IQ modulating unit 58A and the second IQ modulating unit 58B. The LD 56 outputs an optical signal to the BS 57. The BS 57 outputs the optical signal to the first IQ modulating unit 58A and the second IQ modulating unit 58B. The first IQ modulating unit 58A generates an optical modulation signal at the X polarization component side that optically modulates the optical signal to the driving signal. The second IQ modulating unit 58B generates an optical modulation signal at the Y polarization component side that optically modulates the optical signal to the driving signal. The PBC 59 combines the optical modulation signal at the X polarization component side from the first IQ modulating unit 58A and the optical modulation signal at the Y polarization component side from the second IQ modulating unit 58B and outputs the optical modulation signal to the transmission path as a transmission symbol. The CPU 60 is a control unit which controls the entire transmitting device 50.

Figure 5:
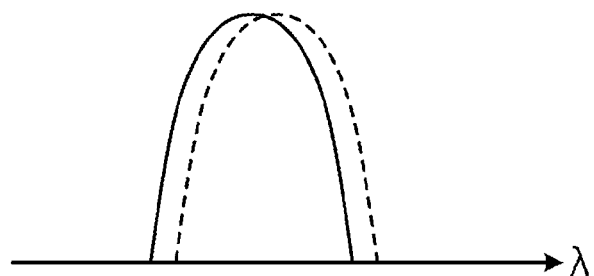
FIG. 5 is an explanatory diagram illustrating an example of a spectrum of a supervisory control signal.

FIG. 5 is an explanatory diagram illustrating an example of a spectrum of a supervisory control signal. The optical transmission system 1 of the present embodiment uses a modulation scheme which superimposes the supervisory control signal onto the wavelength. As for the modulation scheme, for example, a frequency shift keying-supervisory (FSK-SV) scheme is used. In the FSK-SV scheme, for example, the signal processing unit 53 of the transmitting device 50 of the transponder 40 generates a supervisory control signal which swings a predetermined wavelength λ as an FSK signal. When the wavelength λ is swung, the signal processing unit 53 shifts each bit "0" and "1" of the digital signal. Further, the signal processing unit 53 modulates the main signal to the wavelength λ by a phase modulation, and outputs a signal obtained by superimposing the FSK signal onto the wavelength λ by a frequency modulation. Since the FSK signal has a smaller capacity than that of the main signal, communication is available even when the main signal is not communicated.

In the FSK-SV scheme, a usage application is assumed in which a control signal and the like is directly transmitted and received between the transponders without going through a controller on a network. In the related art, the communication is only available between facing transponders in which a transmission path is established, but in the future, the communication may be performed for a second transponder which uses an adjacent wavelength of a first transponder.

Figure 6:
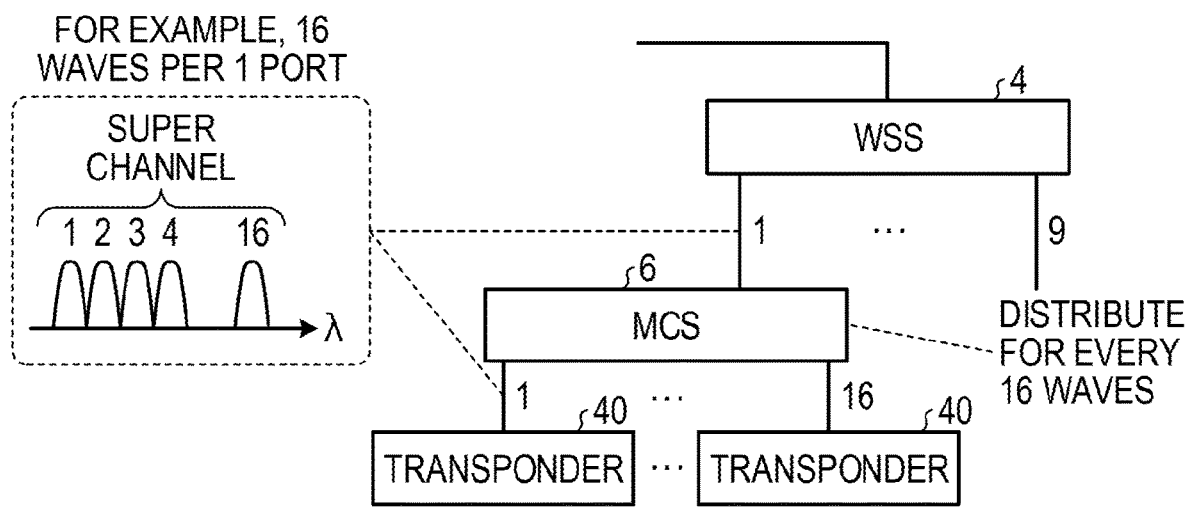
FIG. 6 is an explanatory diagram illustrating an example of the optical transmitting device adopting a super channel scheme.

In the optical transmission technology, for a large capacity, a technology called "super channel" is investigated for use in addition to the WDM technology. FIG. 6 is an explanatory diagram illustrating an example of the optical transmitting device adopting a super channel scheme. In the configuration by the WSS 4 and the MCS 6, for example, optical signals of 16 waves of continuous channels are input to each transponder 40. In this case, the receiving device 10 of each transponder 40 receives an optical signal of a target wavelength to be selected by controlling the LO light source 11. In this case, the supervisory control signal receiving circuit 30 of the DSP 17 of the receiving device 10 performs a filtering so that the signal of a target wavelength is extracted from the received signal. Because of this, the power (signal intensity) of the adjacent wavelength becomes weak, but the supervisory control signal receiving circuit 30 may monitor a portion of the adjacent wavelength.

Figure 7:
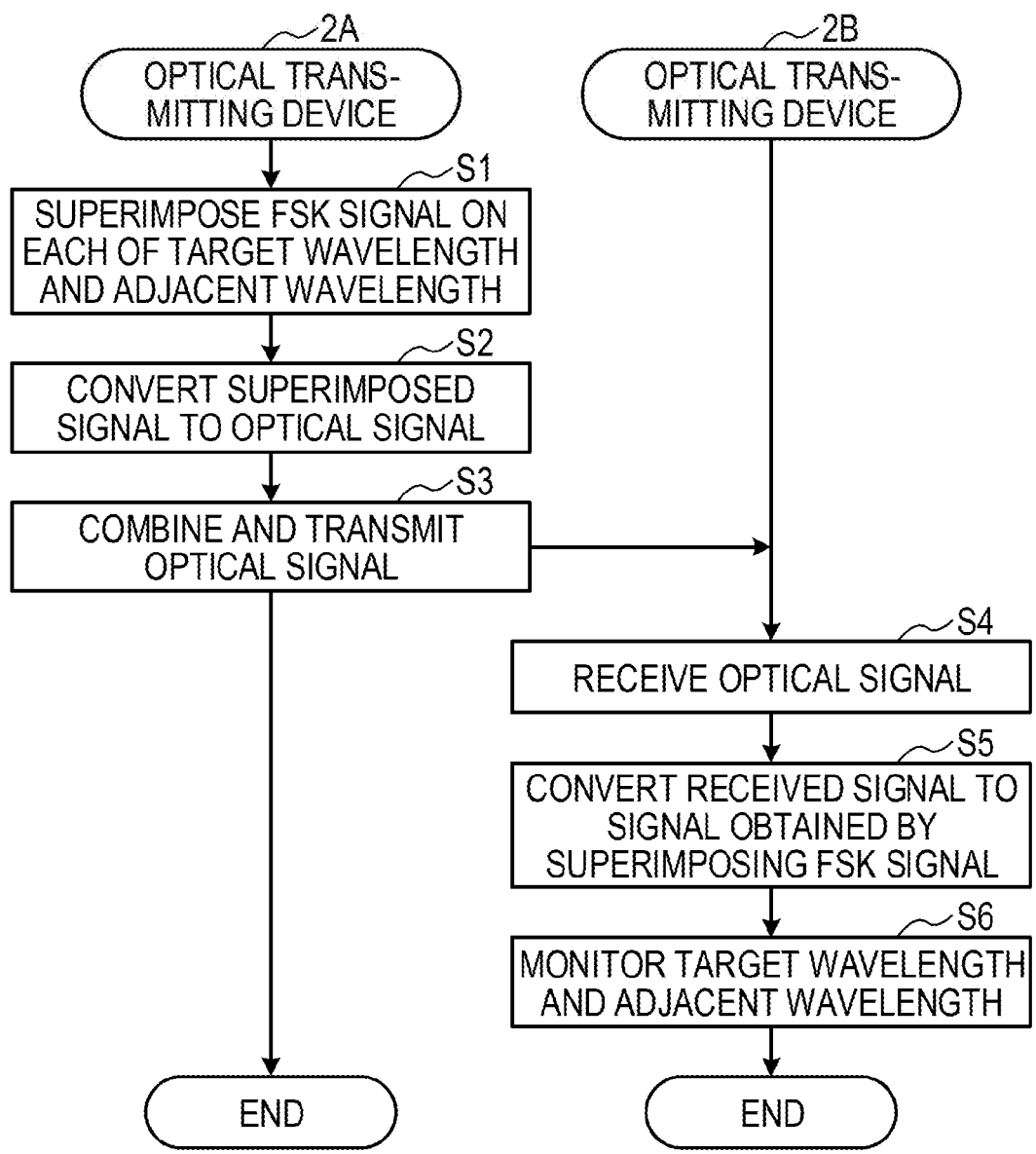
FIG. 7 is a flowchart illustrating an example of an operation of the optical transmission system according to the present embodiment.

FIG. 7 is a flowchart illustrating an example of an operation of the optical transmission system 1 according to the present embodiment. For example, in the optical transmitting device 2A, the transmitting device 50 of the transponder 40 modulates a main signal to a target wavelength and an adjacent wavelength which is adjacent to the target wavelength by a phase modulation, and superimposes an FSK signal onto each of the target wavelength and the adjacent wavelength (operation S1). The transmitting device 50 converts the signals obtained by superimposing the FSK signal on each of the target wavelength and the adjacent wavelength into an optical signal (operation S2). The ROADM 3A combines the optical signal wavelength-multiplexed by the transmitting device 50 of the transponder 40, and transmits the combined optical signal to the optical transmitting device 2B through the optical transmission path (operation S3). In the optical transmitting device 2B, the ROADM 3B receives and separates the optical signal from the optical transmitting device 2A (operation S4). The receiving device 10 of the transponder 40 receives the optical signal from the ROADM 3B, and converts the received signal to a signal obtained by superimposing an FSK signal on each of the target wavelength and the adjacent wavelength (operation S5). The receiving device 10 monitors the target wavelength and a portion of the adjacent wavelength from the signal obtained by superimposing the FSK signal onto each of the target wavelength and the adjacent wavelength (operation S6).

Figure 8:
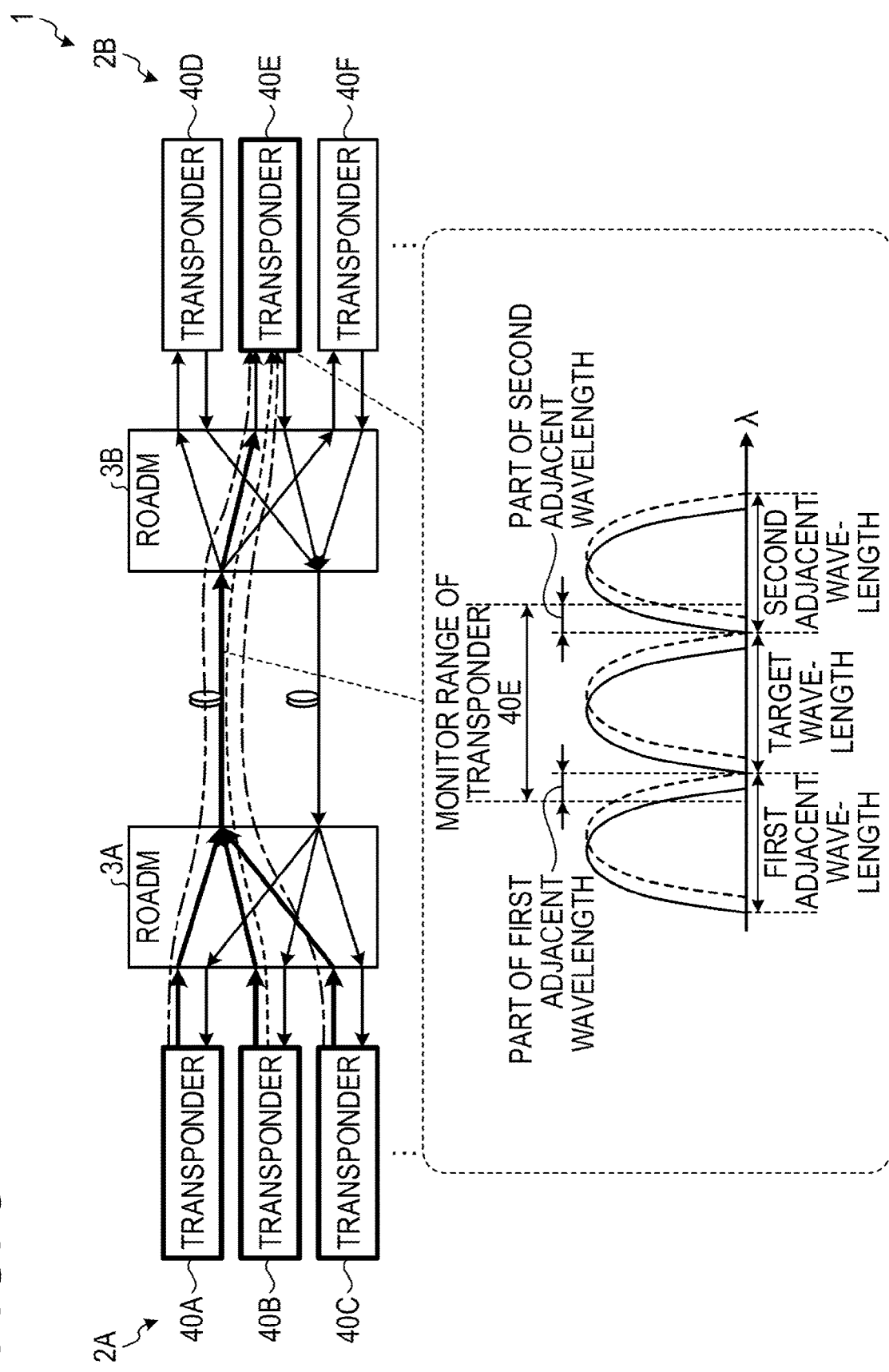
FIG. 8 is an explanatory diagram illustrating an example of an operation result of the optical transmission system according to the present embodiment.

FIG. 8 is an explanatory diagram illustrating an example of an operation result of the optical transmission system 1 according to the present embodiment. The receiving device 10 of the transponder 40 (e.g., the transponder 40E) of the optical transmitting device 2B monitors the target wavelength and a portion of the adjacent wavelength from the signal obtained by superimposing the FSK signal on each of the target wavelength and the adjacent wavelength (refer to "a monitor range of the transponder 40E" in FIG. 8). Accordingly, the receiving device 10 may detect the FSK signal (a dotted line in FIG. 8) of the target wavelength and the FSK signal (an alternated long and short dash line in FIG. 8) of the adjacent wavelength. As a result, the receiving device 10 may perform a communication even on the second transponder (e.g., the transponders 40A and 40C) which uses the adjacent wavelength of the facing first transponder (e.g., the transponder 40B). Herein, in the present embodiment, the portions of the wavelengths of both sides are monitored, but a portion of the adjacent wavelength of one side may be monitored.

Figure 9:
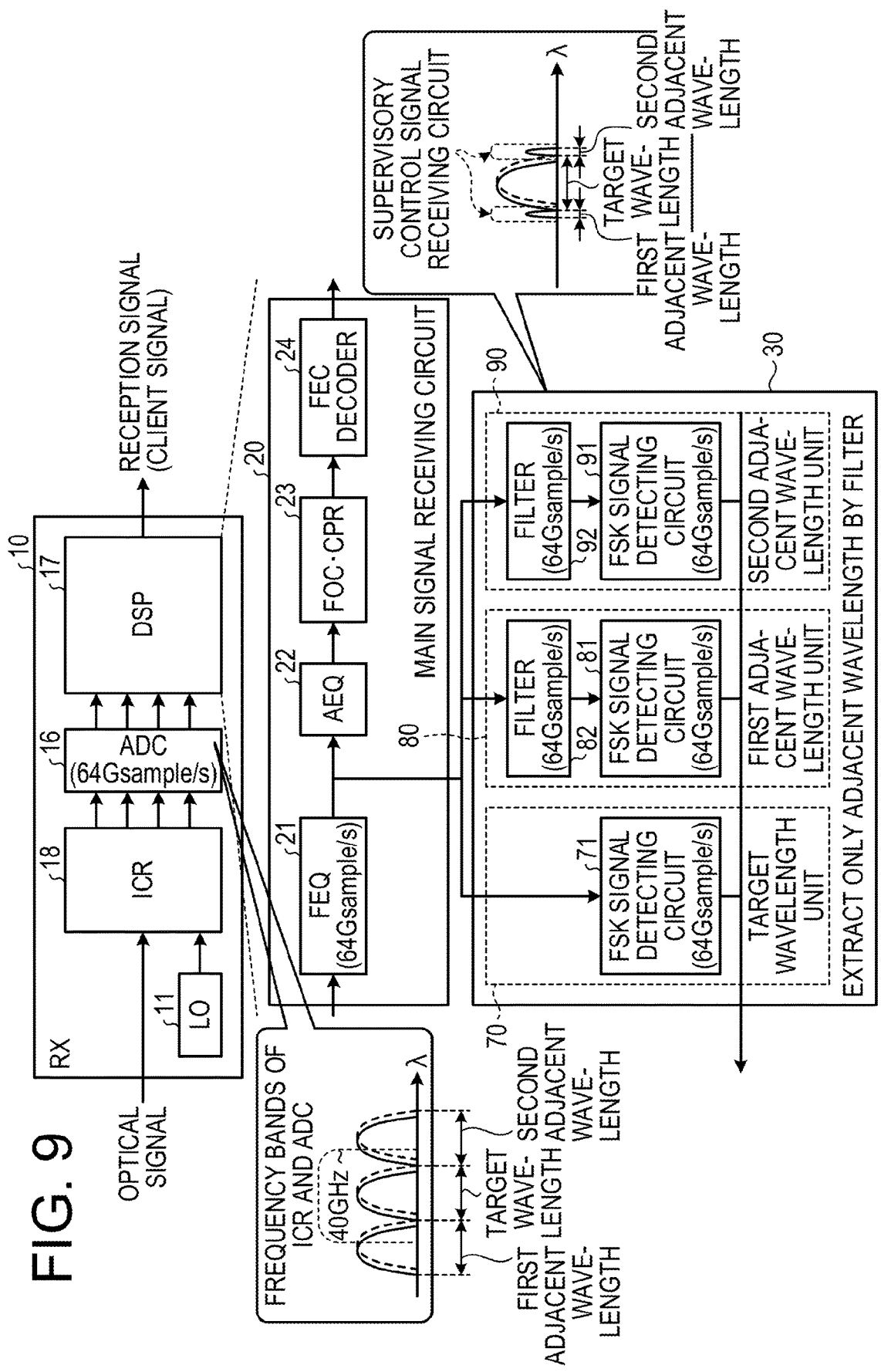
FIG. 9 is a block diagram illustrating an example of a functional configuration of a DSP within a receiving device according to a first embodiment.
Figure 10:
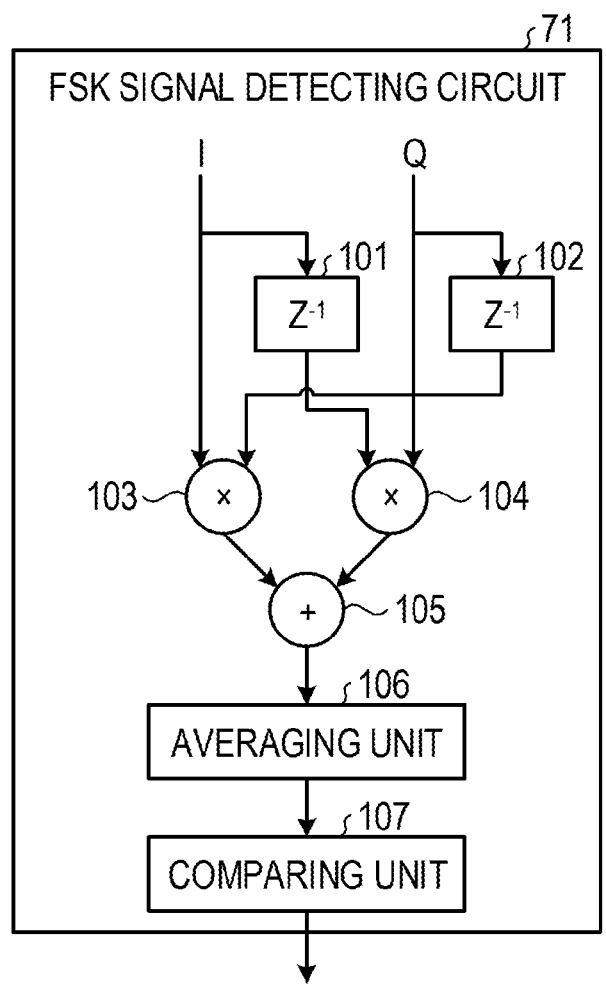
FIG. 10 is a block diagram illustrating an example of an FSK signal detecting circuit.

Next, the configuration of the receiving device 10 which monitors the target wavelength and a portion of the adjacent wavelength will be described. FIG. 9 is a block diagram illustrating an example of a functional configuration of the DSP 17 within the receiving device 10 according to a first embodiment. FIG. 10 is a block diagram illustrating an example of an FSK signal detecting circuit 71.

As illustrated in FIG. 9, the ICR 18 of the receiving device 10 is a receiving unit which receives a wavelength-multiplexed optical signal. The ADC 16 is a filter which transmits the target wavelength and a portion of the adjacent wavelength adjacent to the target wavelength from the signal received by the ICR 18. For example, the predetermined frequency bands of the ICR 18 and the ADC 16 are 40 GHz or more. In this case, the sampling rates of the ICR 18 and the ADC 16 are 64 Gsample/s. The main signal receiving circuit 20 of the DSP 17 of the receiving device 10 receives (detects) a main signal of the target wavelength from the signal transmitted by the ADC 16. Three units, which detect the FSK signals of the target wavelength, and the first and second adjacent wavelengths from the signal transmitted by the ADC 16, are provided within the supervisory control signal receiving circuit 30 of the DSP 17 of the receiving device 10.

For example, as illustrated in FIG. 9, a target wavelength unit 70 is provided in the supervisory control signal receiving circuit 30. The target wavelength unit 70 includes the FSK signal detecting circuit 71. The FSK signal detecting circuit 71 detects the FSK signal of the target wavelength from the output signal of the ADC 16 or the signal obtained by compensating for the output signal of the ADC 16 by the FEQ 21 within the main signal receiving circuit 20. For example, the sampling rate of the FSK signal detecting circuit 71 is 64 Gsample/s.

Herein, the FSK signal detecting circuit 71 is a monitor circuit which detects an FSK signal by monitoring the frequency offset. For example, as illustrated in FIG. 10, the FSK signal detecting circuit 71 includes Z converting units 101 and 102, multiplying units 103 and 104, an adding unit 105, an averaging unit 106, and a comparing unit 107. The Z converting units 101 and 102 shift one symbol for the signals of the I component and the Q component, respectively. The multiplying unit 103 multiplies the signal of the I component and the signal from the Z converting unit 101. The multiplying unit 104 multiplies the signal of the Q component and the signal from the Z converting unit 102. The adding unit 105 adds the signals from the multiplying units 103 and 104, and the averaging unit 106 averages the signal from the adding unit 105. The comparing unit 107 compares the signal value from the averaging unit 106 with a threshold value, and outputs a comparison result as an FSK signal.

Figure 11:
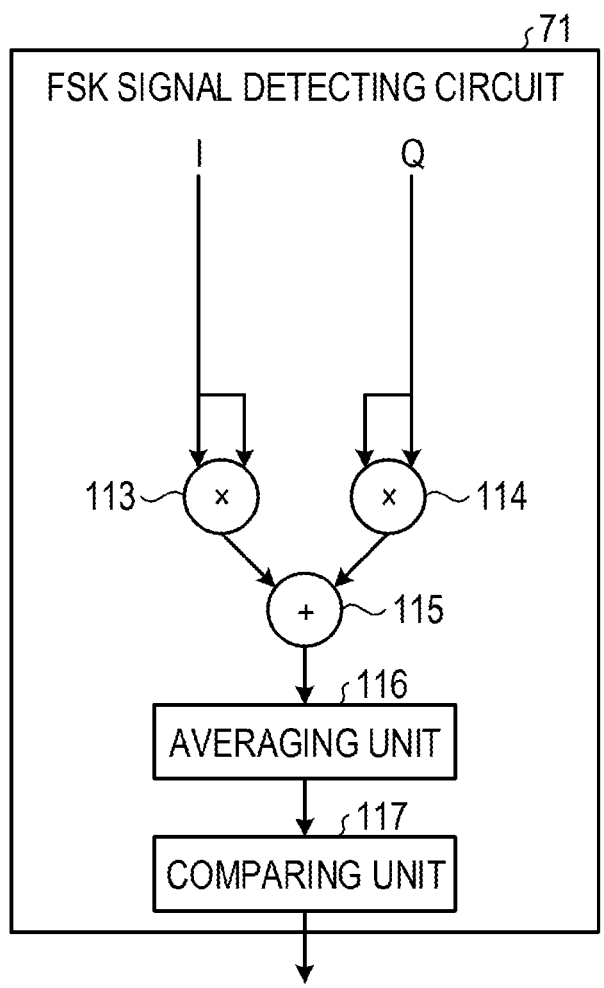
FIG. 11 is a block diagram illustrating an example of the FSK signal detecting circuit.

Alternatively, the FSK signal detecting circuit 71 is a monitor circuit which detects an FSK signal by monitoring the power (e.g., signal intensity). For example, as illustrated in FIG. 11, the FSK signal detecting circuit 71 includes multiplying units 113 and 114, an adding unit 115, an averaging unit 116, and a comparing unit 117. The multiplying unit 113 multiplies a signal of the I component and a signal of the I component. The multiplying unit 114 multiplies the signal of the Q component and the signal of the Q component. The adding unit 115 adds the signals from the multiplying units 113 and 114, and the averaging unit 116 averages the signal from the adding unit 115. The comparing unit 117 compares the signal value from the averaging unit 116 with a threshold value, and outputs a comparison result as an FSK signal.

As illustrated in FIG. 9, a first adjacent wavelength unit 80 is provided in the supervisory control signal receiving circuit 30. The first adjacent wavelength unit 80 includes an FSK signal detecting circuit 81 and a filter 82. The filter 82 allows a signal of the first adjacent wavelength to pass for the output signal of the ADC 16 or the signal obtained by compensating for the output signal of the ADC 16 by the FEQ 21 within the main signal receiving circuit 20. The FSK signal detecting circuit 81 detects an FSK signal of the first adjacent wavelength from the signal passing the filter 82. For example, the sampling rates of the filter 82 and the FSK signal detecting circuit 81 are 64 Gsample/s. Since the configuration of the FSK signal detecting circuit 81 is the same as the configuration of the FSK signal detecting circuit 71, a description thereof will be omitted.

As illustrated in FIG. 9, a second adjacent wavelength unit 90 is provided in the supervisory control signal receiving circuit 30. The second adjacent wavelength unit 90 includes an FSK signal detecting circuit 91 and a filter 92. The filter 92 allows a signal of the second adjacent wavelength to pass for the output signal of the ADC 16 or the signal obtained by compensating for the output signal of the ADC 16 by the FEQ 21 within the main signal receiving circuit 20. The FSK signal detecting circuit 91 detects an FSK signal of the second adjacent wavelength from the signal passing the filter 92. For example, sampling rates of the filter 92 and the FSK signal detecting circuit 91 are 64 Gsample/s. Since the configuration of the FSK signal detecting circuit 91 is the same as the configuration of the FSK signal detecting circuit 71, a description thereof will be omitted.

Accordingly, in the optical transmission system 1 of the first embodiment, the sampling rate may be decreased as compared to the related art by monitoring a portion of the adjacent wavelength. As a result, the circuit size of the supervisory control signal receiving circuit 30 may be decreased as compared to that of the related art. As a result, the optical transmission system 1 of the first embodiment may detect a supervisory control signal of an adjacent wavelength without increasing the circuit size. The effect of the first embodiment will be described by using the configuration of FIG. 12.

Figure 12:
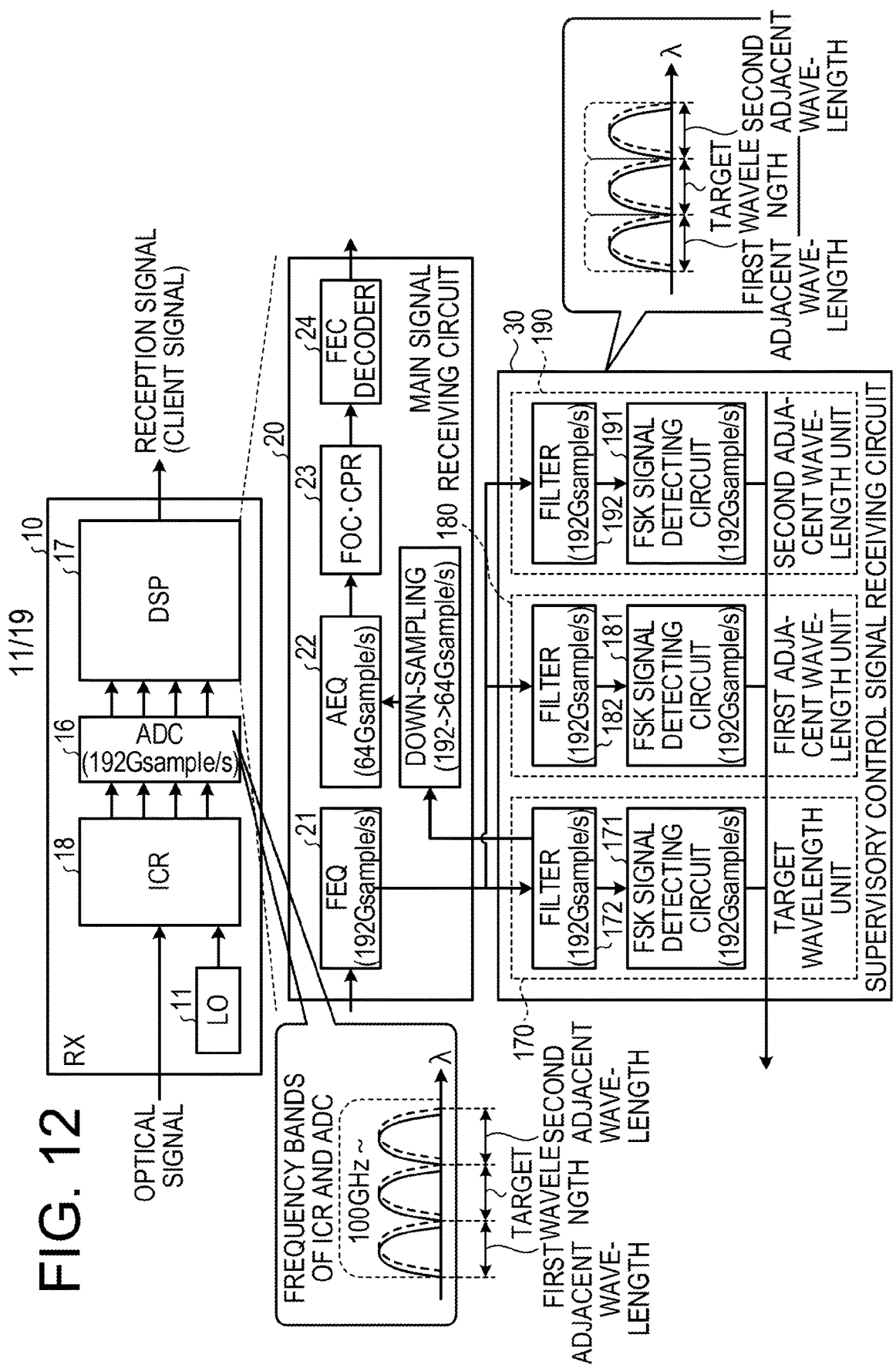
FIG. 12 is an explanatory diagram illustrating an example of an increase in a circuit size of the functional configuration of the DSP within the receiving device.

FIG. 12 is an explanatory diagram illustrating an example of an increase in a circuit size of the functional configuration of the DSP 17 within the receiving device 10. The ICR 18 of the receiving device 10 is a receiving unit which receives a wavelength-multiplexed optical signal. The ADC 16 is a filter which transmits the target wavelength and a portion of the adjacent wavelength adjacent to the target wavelength from the signal received by the ICR 18. For example, predetermined frequency bands of the ICR 18 and the ADC 16 are 100 GHz or more. In this case, the sampling rates of the ICR 18 and the ADC 16 are 192 Gsample/s. The main signal receiving circuit 20 of the DSP 17 of the receiving device 10 receives (detects) a main signal of the target wavelength from the signal transmitted by the ADC 16. Three units, which detect the FSK signals of the target wavelength and first and second adjacent wavelengths from the signal transmitted by the ADC 16, are provided within the supervisory control signal receiving circuit 30 of the DSP 17 of the receiving device 10.

For example, a target wavelength unit 170 is provided in the supervisory control signal receiving circuit 30. The target wavelength unit 170 includes an FSK signal detecting circuit 171 and a filter 172. The filter 172 allows a signal of the target wavelength to pass for the signal obtained by compensating for the output signal of the ADC 16 by the FEQ 21 within the main signal receiving circuit 20. The FSK signal detecting circuit 171 detects an FSK signal of the target wavelength from the signal passing the filter 172. For example, the sampling rates of the filter 172 and the FSK signal detecting circuit 171 are 192 Gsample/s.

A first adjacent wavelength unit 180 is provided in the supervisory control signal receiving circuit 30. The first adjacent wavelength unit 180 includes an FSK signal detecting circuit 181 and a filter 182. The filter 182 allows a signal of the first adjacent wavelength to pass for the signal obtained by compensating for the output signal of the ADC 16 by the FEQ 21 within the main signal receiving circuit 20. The FSK signal detecting circuit 181 detects an FSK signal of the first adjacent wavelength from the signal passing the filter 182. For example, the sampling rates of the filter 182 and the FSK signal detecting circuit 181 are 192 Gsample/s.

A second adjacent wavelength unit 190 is provided in the supervisory control signal receiving circuit 30. The second adjacent wavelength unit 190 includes an FSK signal detecting circuit 191 and a filter 192. The filter 192 allows a signal of the second adjacent wavelength to pass for the signal obtained by compensating for the output signal of the ADC 16 by the FEQ 21 within the main signal receiving circuit 20. The FSK signal detecting circuit 191 detects an FSK signal of the second adjacent wavelength from the signal passing the filter 192. For example, the sampling rates of the filter 192 and the FSK signal detecting circuit 191 are 192 Gsample/s.

As described above, when the adjacent wavelength adjacent to the target wavelength is monitored in addition to the target wavelength, the size of the supervisory control signal receiving circuit 30 of the DSP 17 of the receiving device 10 is increased, which is not realistic.

In the meantime, in the optical transmission system 1 of the first embodiment, the sampling rate becomes 64 Gsample/s by monitoring a portion of the adjacent wavelength. As a result, the sampling rate may be decreased by ⅓ times of the sampling rate of 192 Gsample/s of the related art. Further, in the optical transmission system 1 of the first embodiment, the influence of the power of the adjacent wavelength may be sufficiently decreased, so that it is not necessary to provide a filter which allows a signal of the target wavelength to pass in the target wavelength unit 70 of the supervisory control signal receiving circuit 30. Accordingly, in the optical transmission system 1 of the first embodiment, the size of the supervisory control signal receiving circuit 30 may be decreased compared to that of the related art. As a result, the optical transmission system 1 of the first embodiment may detect a supervisory control signal of an adjacent wavelength without increasing the circuit size.

In the first embodiment, the sampling rates of the ICR 18 and the ADC 16 are decreased compared to those of the related art, so that a filter which allows a signal of the target wavelength to pass is not provided in the target wavelength unit 70 of the supervisory control signal receiving circuit 30. However, when the size of the supervisory control signal receiving circuit 30 is decreased compared to that of the related art by decreasing the sampling rate compared to that of the related art, a filter may be provided in the target wavelength unit 70 of the supervisory control signal receiving circuit 30.

Second Embodiment

Figure 13:
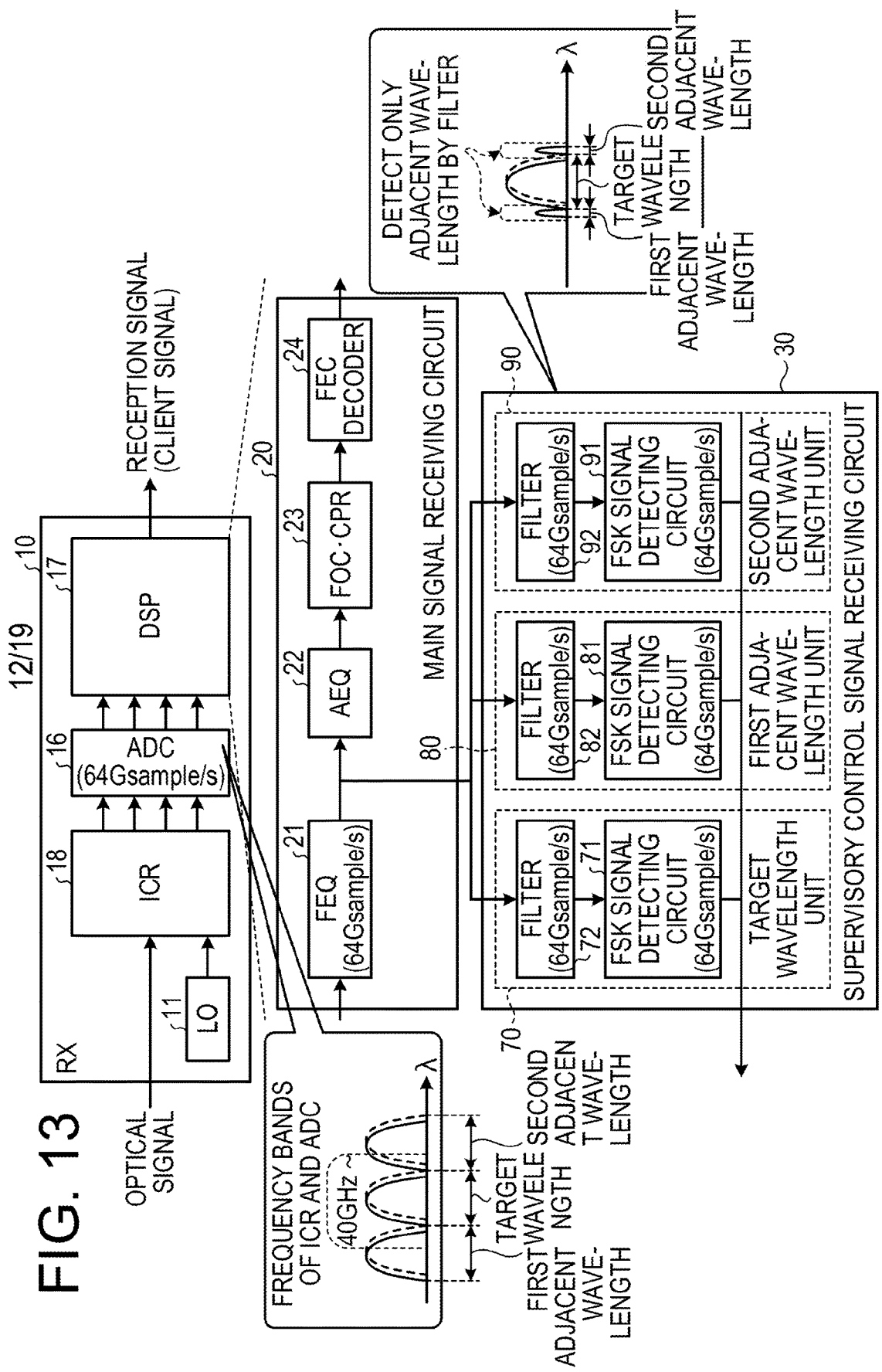
FIG. 13 is a block diagram illustrating an example of a functional configuration of a DSP within a receiving device according to a second embodiment.

FIG. 13 is a block diagram illustrating an example of a functional configuration of a DSP 17 within a receiving device 10 according to a second embodiment. Further, the same configurations as that of the optical transmission system 1 of the first embodiment are denoted by the same reference numerals, so that descriptions of an overlapping configuration and operation will be omitted.

A target wavelength unit 70 of a supervisory control signal receiving circuit 30 additionally includes a filter 72. The filter 72 allows a signal of the target wavelength to pass for an output signal of an ADC 16 or a signal obtained by compensating for the output signal of the ADC 16 by an FEQ 21 within a main signal receiving circuit 20. An FSK signal detecting circuit 71 detects the FSK signal of the target wavelength from the signal passing the filter 72. For example, the sampling rates of the filter 72 and the FSK signal detecting circuit 71 are 64 Gsample/s which is the same as the sampling rates of an ICR 18 and an ADC 16. Other configurations and operations are the same as those of the optical transmission system 1 of the first embodiment.

In the first embodiment, the supervisory control signal receiving circuit 30 monitors a portion of the adjacent wavelength while the frequency bands of the ICR 18 and the ADC 16 are 40 GHz or more and the sampling rates of the ICR 18 and the ADC 16 are 64 Gsample/s. However, the supervisory control signal receiving circuit 30 may perform a frequency offset control and down sampling. An embodiment of this case will be described below as a third embodiment.

Third Embodiment

Figure 14:
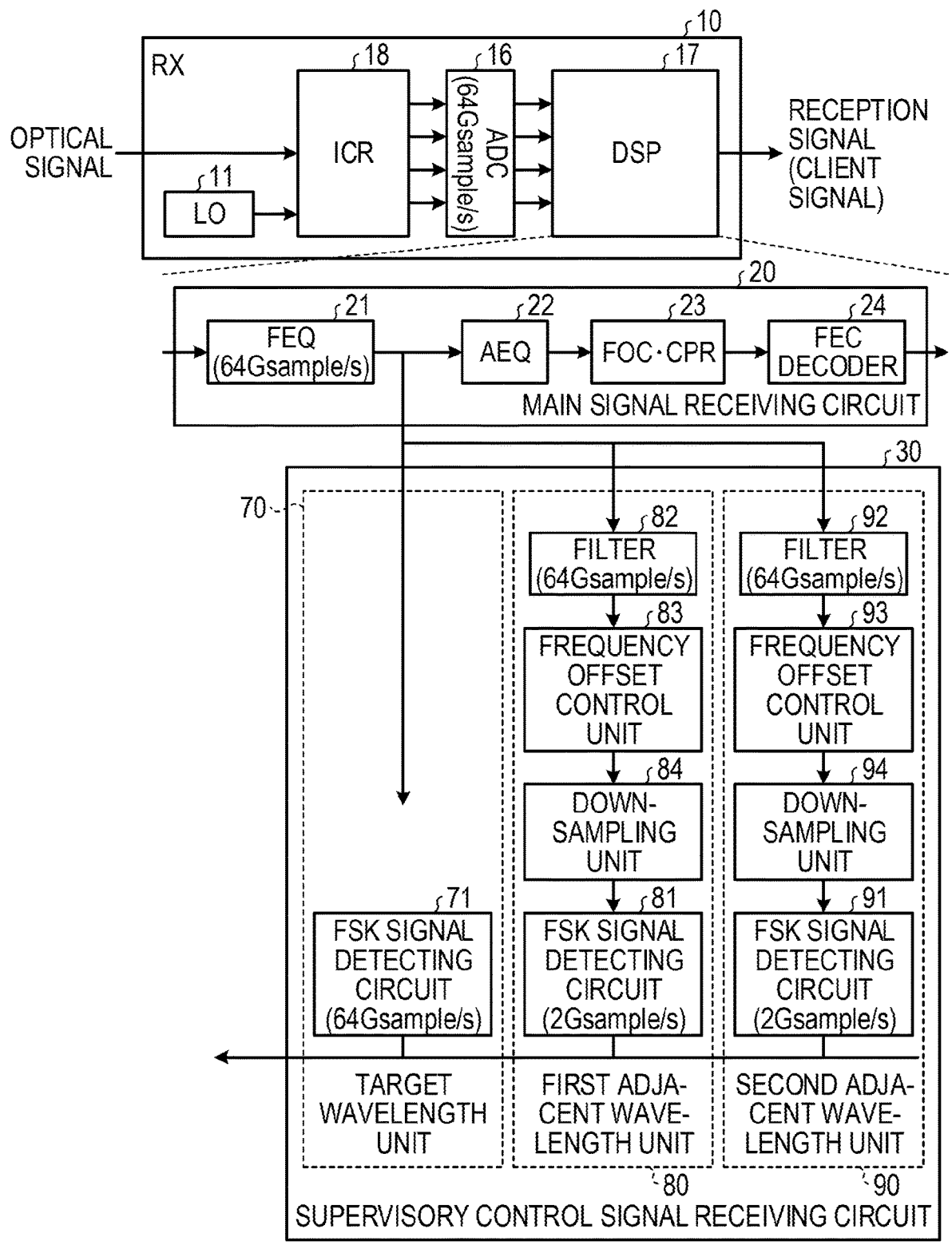
FIG. 14 is a block diagram illustrating an example of a functional configuration of a DSP within a receiving device according to a third embodiment.
Figure 15:
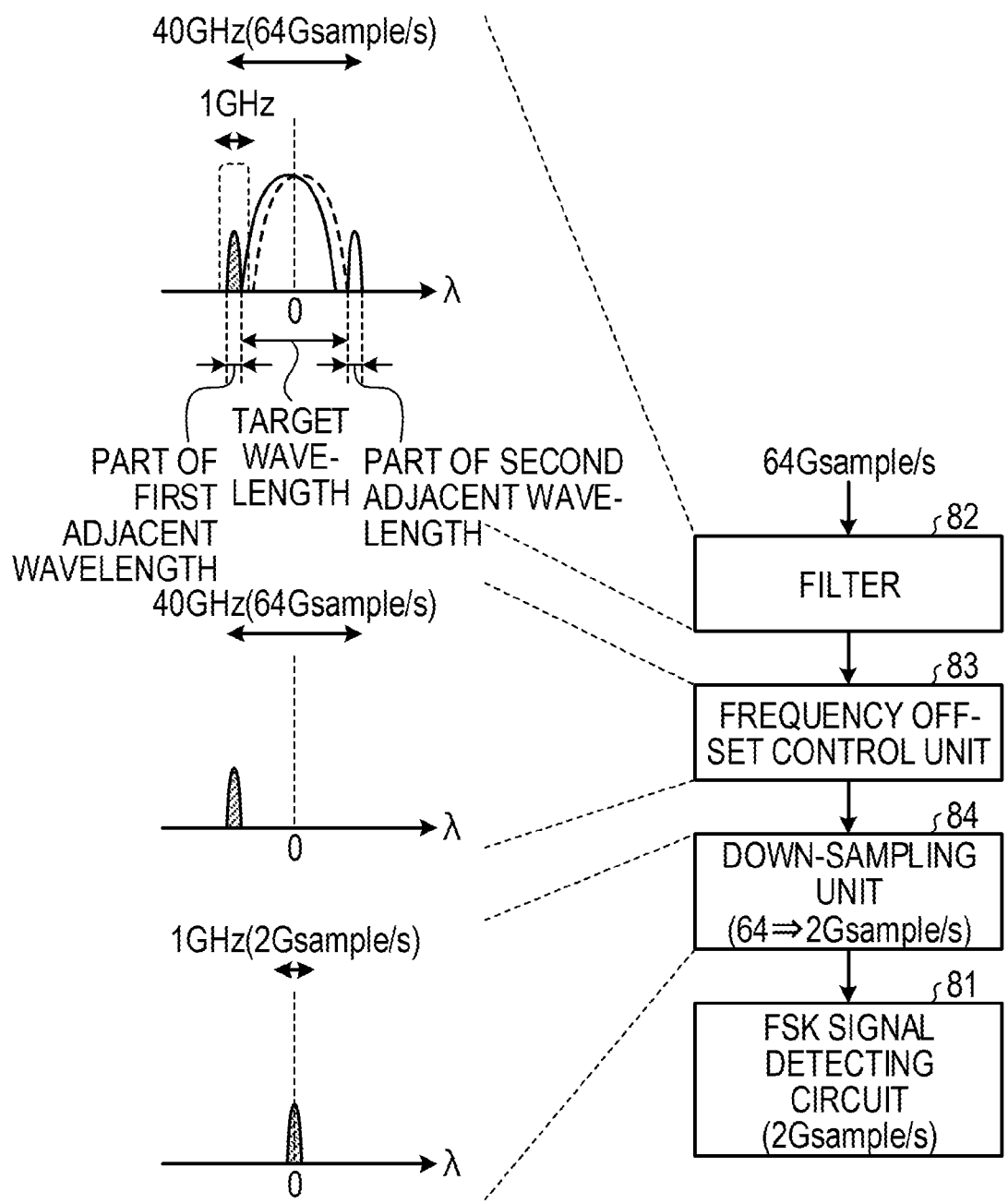
FIG. 15 is an explanatory diagram illustrating an example of a frequency offset control and down-sampling.

FIG. 14 is a block diagram illustrating an example of a functional configuration of a DSP 17 within a receiving device 10 according to a third embodiment. FIG. 15 is an explanatory diagram illustrating an example of a frequency offset control and down-sampling. Further, the same configurations as that of the optical transmission system 1 of the first embodiment are denoted by the same reference numerals, so that descriptions of an overlapping configuration and operation will be omitted.

As illustrated in FIG. 14, a first adjacent wavelength unit 80 of a supervisory control signal receiving circuit 30 of the DSP 17 of the receiving device 10 additionally includes a frequency offset control unit 83 and a down-sampling unit 84. As illustrated in FIG. 15, the frequency offset control unit 83 performs an offset of a frequency for a signal passing the filter 82. The down-sampling unit 84 performs a down-sampling on the signal on which the frequency offset is performed by the frequency offset control unit 83. As illustrated in FIG. 15, for example, when the frequency band of a first adjacent wavelength is 1 GHz, the down-sampling unit 84 decreases the sampling rate from 64 Gsample/s to 2 Gsample/s. An FSK signal detecting circuit 81 detects an FSK signal of the first adjacent wavelength from the signal on which a down-sampling is performed by the down-sampling unit 84.

As illustrated in FIG. 14, a second adjacent wavelength unit 90 of the supervisory control signal receiving circuit 30 additionally includes a frequency offset control unit 93 and a down-sampling unit 94. The frequency offset control unit 93 performs an offset of a frequency on the signal passing the filter 92. The down-sampling unit 94 performs a down-sampling on the signal on which the frequency offset is performed by the frequency offset control unit 93. For example, when a frequency band of a second adjacent wavelength is 1 GHz, the down-sampling unit 94 decreases the sampling rate from 64 Gsample/s to 2 Gsample/s. An FSK signal detecting circuit 91 detects an FSK signal of a second adjacent wavelength from the signal on which a down-sampling is performed by the down-sampling unit 94.

Accordingly, in the optical transmission system 1 of the third embodiment, the sampling rates of the FSK signal detecting circuits 81 and 91 may be decreased by 1/32 times of those of the first embodiment by performing the frequency offset control and down-sampling. Because of this, the optical transmission system 1 of the third embodiment may decrease the amount of processing of the FSK signal detecting circuits 81 and 91. Further, in the optical transmission system 1 of the third embodiment, the sampling rates of the FSK signal detecting circuits 81 and 91 are decreased by 1/32 times those of the first embodiment. As a result, the circuit sizes of the FSK signal detecting circuits 81 and 91 may be decreased as compared to that of the first embodiment.

In the third embodiment, a target wavelength and an adjacent wavelength are monitored in each unit. However, the supervisory control signal receiving circuit 30 may monitor a target wavelength and an adjacent wavelength in time series. An embodiment of this case will be described below as a fourth embodiment.

Fourth Embodiment

Figure 16:
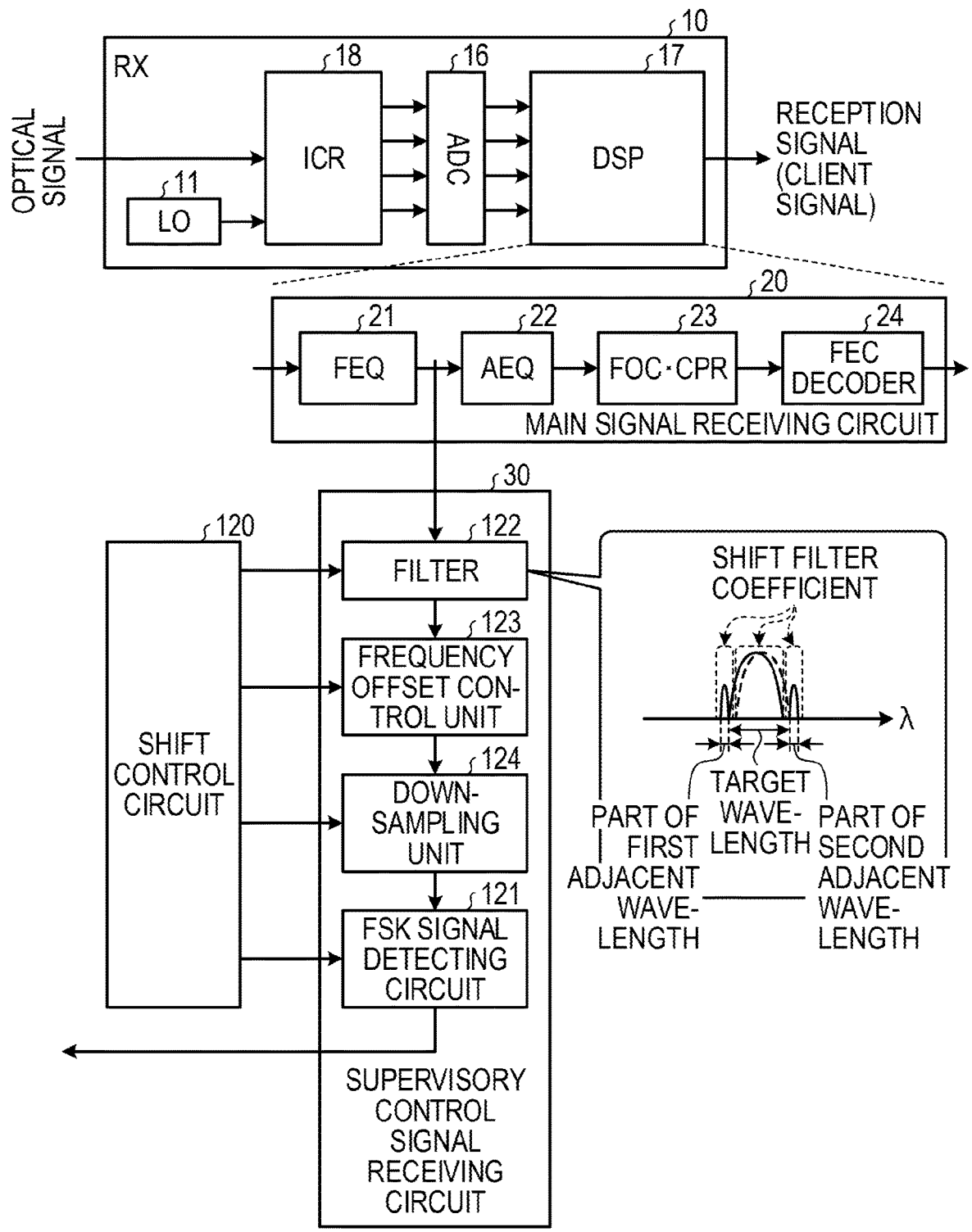
FIG. 16 is a block diagram illustrating an example of a functional configuration of a DSP within a receiving device according to a fourth embodiment.

FIG. 16 is a block diagram illustrating an example of a functional configuration of a DSP 17 within a receiving device 10 according to a fourth embodiment. Herein, the same configurations as that of the optical transmission system 1 of the third embodiment are denoted by the same reference numerals, so that descriptions of an overlapping configuration and operation will be omitted.

The DSP 17 of the receiving device 10 additionally includes a shift control circuit 120. Further, the supervisory control signal receiving circuit 30 of the DSP 17 of the receiving device 10 includes an FSK signal detecting circuit 121, a filter 122, a frequency offset control circuit 123, and a down-sampling unit 124.

The shift control circuit 120 controls the FSK signal detecting circuit 121, the filter 122, the frequency offset control circuit 123, and the down-sampling unit 124 in time series.

First, the shift control circuit 120 outputs a first control signal to the FSK signal detecting circuit 121, the filter 122, the frequency offset control circuit 123, and the down-sampling unit 124. For example, the filter 122 applies a first filter coefficient according to the first control signal. The first filter coefficient indicates a frequency band of a target wavelength. In this case, the filter 122 allows a signal of the target wavelength to pass for an output signal of an ADC 16 or a signal obtained by compensating for the output signal of the ADC 16 by an FEQ 21 within a main signal receiving circuit 20. The frequency offset control unit 123 performs an offset of a frequency for a signal passing the filter 122. The down-sampling unit 124 performs a down-sampling on the signal on which the frequency offset is performed by the frequency offset control unit 123. The FSK signal detecting circuit 121 detects an FSK signal of the target wavelength from the signal on which the down-sampling is performed by the down-sampling unit 124.

Herein, when the shift control circuit 120 outputs the first control signal, the output signal of the ADC 16 or the signal obtained by compensating for the output signal of the ADC 16 by the FEQ 21 within the main signal receiving circuit 20 may be directly output to the FSK signal detecting circuit 121. That is, the output signal of the ADC 16 or the signal obtained by compensating for the output signal of the ADC 16 by the FEQ 21 within the main signal receiving circuit 20 may not pass through the filter 122, the frequency offset control circuit 123, and the down-sampling unit 124.

Next, the shift control circuit 120 outputs a second control signal to the FSK signal detecting circuit 121, the filter 122, the frequency offset control circuit 123, and the down-sampling unit 124. For example, the filter 122 applies a second filter coefficient according to the second control signal. The second filter coefficient indicates the frequency band of a first adjacent wavelength. In this case, the filter 122 allows a signal of the first adjacent wavelength to pass for the output signal of the ADC 16 or the signal obtained by compensating for the output signal of the ADC 16 by the FEQ 21 within the main signal receiving circuit 20. The frequency offset control unit 123 performs an offset of a frequency for the signal passing the filter 122. The down-sampling unit 124 performs a down-sampling on the signal on which the frequency offset is performed by the frequency offset control unit 123. The FSK signal detecting circuit 121 detects an FSK signal of the first adjacent wavelength from the signal on which the down-sampling is performed by the down-sampling unit 124.

Next, the shift control circuit 120 outputs a third control signal to the FSK signal detecting circuit 121, the filter 122, the frequency offset control circuit 123, and the down-sampling unit 124. For example, the filter 122 applies a third filter coefficient according to a third control signal. The third filter coefficient indicates a frequency band of a second adjacent wavelength. In this case, the filter 122 allows a signal of the second adjacent wavelength to pass for the output signal of the ADC 16 or the signal obtained by compensating for the output signal of the ADC 16 by the FEQ 21 within the main signal receiving circuit 20. The frequency offset control unit 123 performs an offset of a frequency for the signal passing the filter 122. The down-sampling unit 124 performs a down-sampling on the signal on which the frequency offset is performed by the frequency offset control unit 123. The FSK signal detecting circuit 121 detects an FSK signal of the second adjacent wavelength from the signal on which the down-sampling is performed by the down-sampling unit 124.

Accordingly, in the optical transmission system 1 of the fourth embodiment, the number of units within the supervisory control signal receiving circuit 30 may be decreased by monitoring the target wavelength and the adjacent wavelength in time series. Accordingly, in the optical transmission system 1 of the fourth embodiment, a size of the supervisory control signal receiving circuit 30 may be decreased compared to that of the third embodiment.

In the fourth embodiment, the target wavelength and the adjacent wavelength are monitored in time series. However, the supervisory control signal receiving circuit 30 may control an LO light source 11 so that power (signal intensity) of the adjacent wavelength is increased. An embodiment of this case will be described below as a fifth embodiment.

Fifth Embodiment

Figure 17:
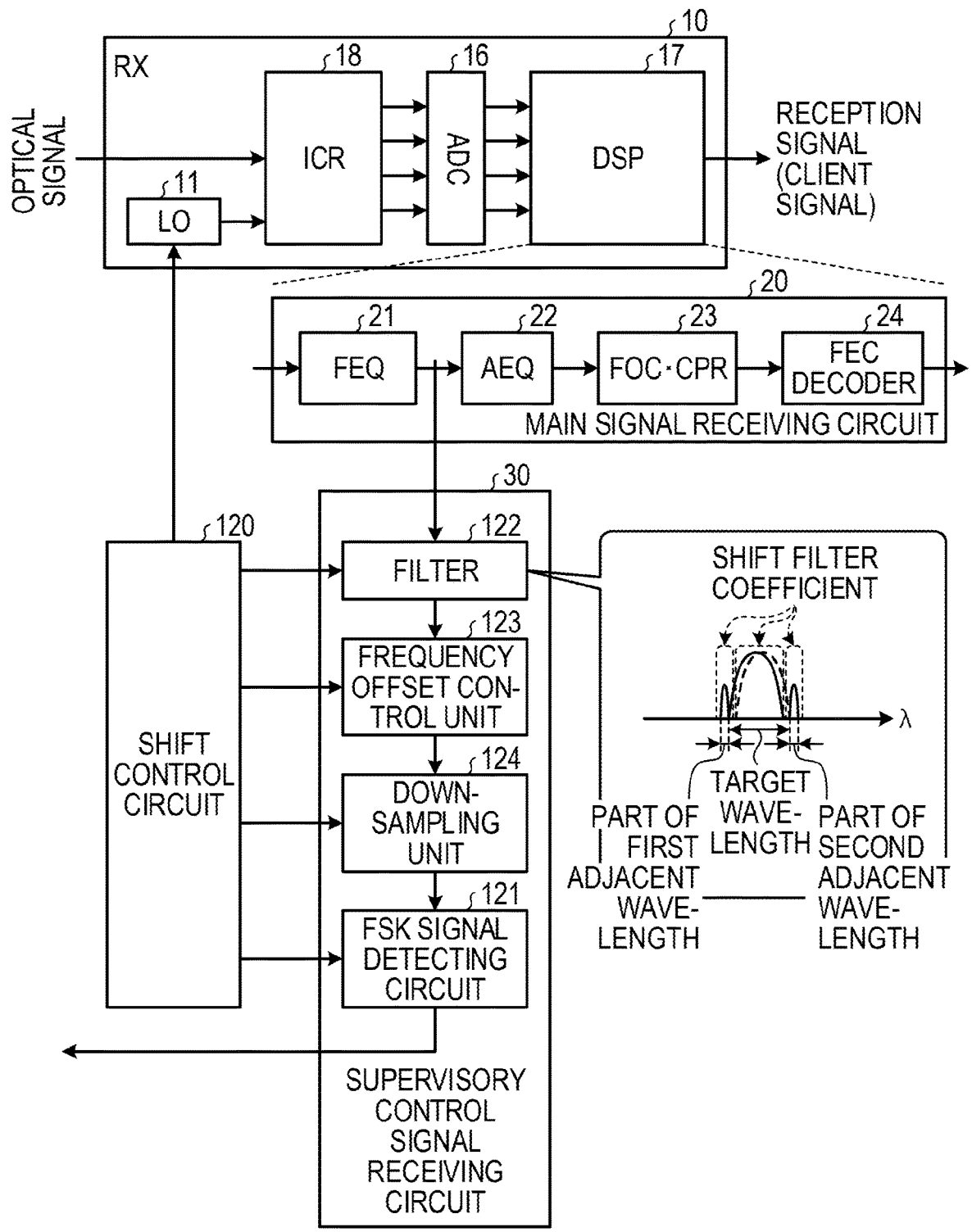
FIG. 17 is a block diagram illustrating an example of a functional configuration of a DSP within a receiving device according to a fifth embodiment.

FIG. 17 is a block diagram illustrating an example of a functional configuration of a DSP 17 within a receiving device 10 according to a fifth embodiment. Further, the same configurations as that of the optical transmission system 1 of the fourth embodiment are denoted by the same reference numerals, so that descriptions of an overlapping configuration and operation will be omitted.

For example, when a second control signal is output to an FSK signal detecting circuit 121, a filter 122, a frequency offset control circuit 123, and a down-sampling unit 124, a shift control circuit 120 controls an LO light source 11 so that power (signal intensity) of a first adjacent wavelength is increased.

When a third control signal is output to the FSK signal detecting circuit 121, the filter 122, the frequency offset control circuit 123, and the down-sampling unit 124, the shift control circuit 120 controls the LO light source 11 so that the power (signal intensity) of a second adjacent wavelength is increased.

Accordingly, in the optical transmission system 1 of the fifth embodiment, the sensitivity when the adjacent wavelength is monitored may be increased.

In the first to fifth embodiments, the FSK signal is superimposed on each of the target wavelength, the first adjacent wavelength adjacent to the target wavelength, and the second adjacent wavelength adjacent to the target wavelength. However, an identification number (ID) of a super channel may be superimposed on the FSK signals, and the receiving device 10 may recognize a relative position within the super channel of the target wavelength based on the ID. An embodiment of this case will be described below as a sixth embodiment.

Sixth Embodiment

Figure 18:
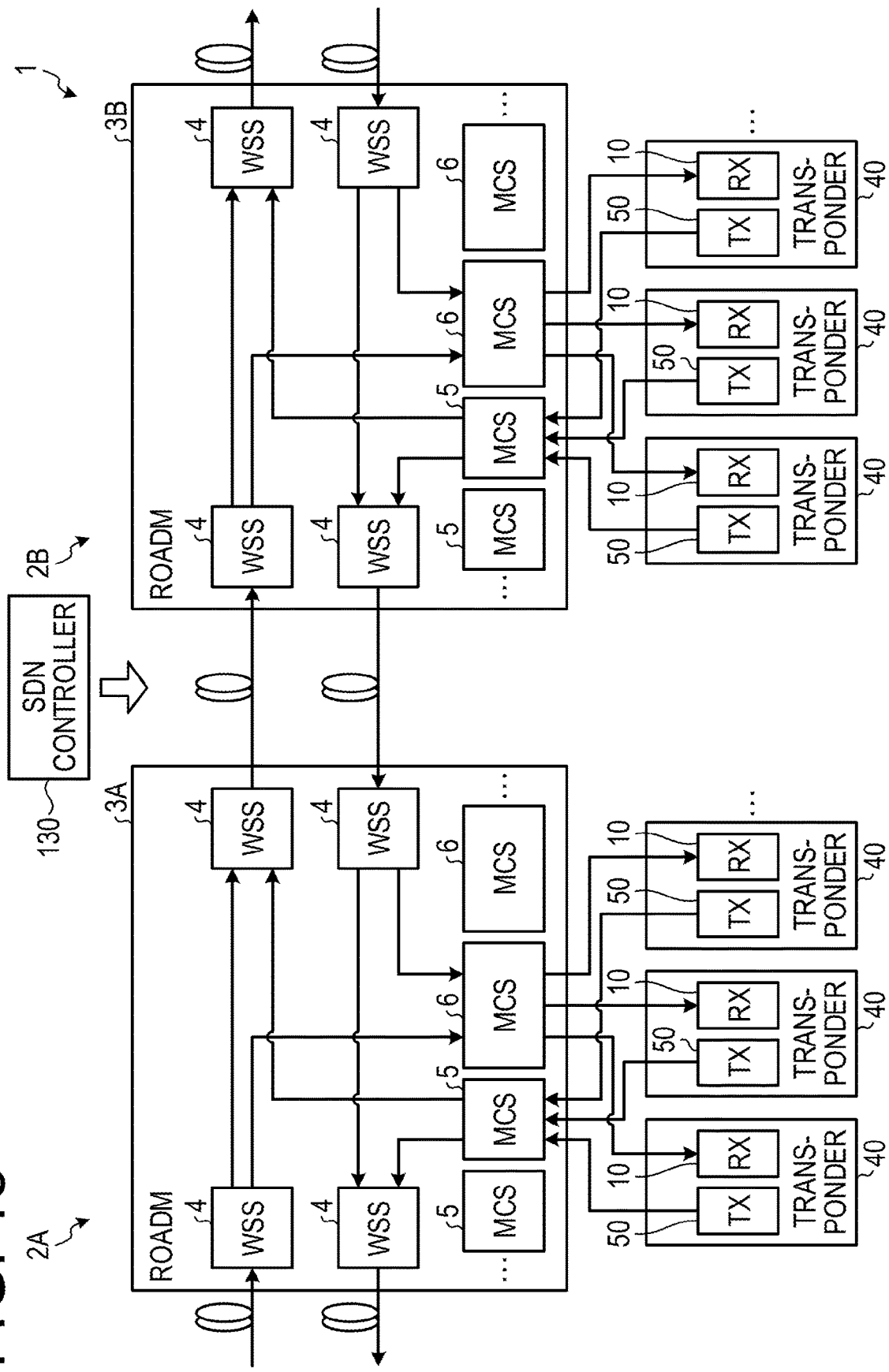
FIG. 18 is an explanatory diagram illustrating an example of an optical transmission system according to a sixth embodiment.

FIG. 18 is an explanatory diagram illustrating an example of an optical transmission system 1 according to a sixth embodiment. The optical transmission system 1 illustrated in FIG. 18 additionally includes a software defined network (SDN) controller 130. The SDN controller 130 notifies a plurality of transponders 40 of optical transmitting devices 2A and 2B of an ID (group ID) of a super channel. In this case, a receiving device 10 of each transponder 40 stores the ID of the super channel notified from the SDN controller 130 in a storage unit (not illustrated).

As described above, the receiving device 10 of the transponder 40 receives (detects) an optical signal, and detects an FSK signal of a target wavelength, an FSK signal of a first adjacent wavelength adjacent to the target wavelength, and an FSK signal of a second adjacent wavelength adjacent to the target wavelength from the received signal. The group ID is superimposed on the FSK signal of the target wavelength, the FSK signal of the first adjacent wavelength adjacent to the target wavelength, and the FSK signal of the second adjacent wavelength adjacent to the target wavelength. Herein, the group ID superimposed on the FSK signal of the first adjacent wavelength is indicated as the "ID on the left side", and the group ID superimposed on the FSK signal of the second adjacent wavelength is indicated as the "ID on the right side". Further, the "ID on the left side" and the "ID on the right side" are indicated as "IDs on both sides".

Figure 19:
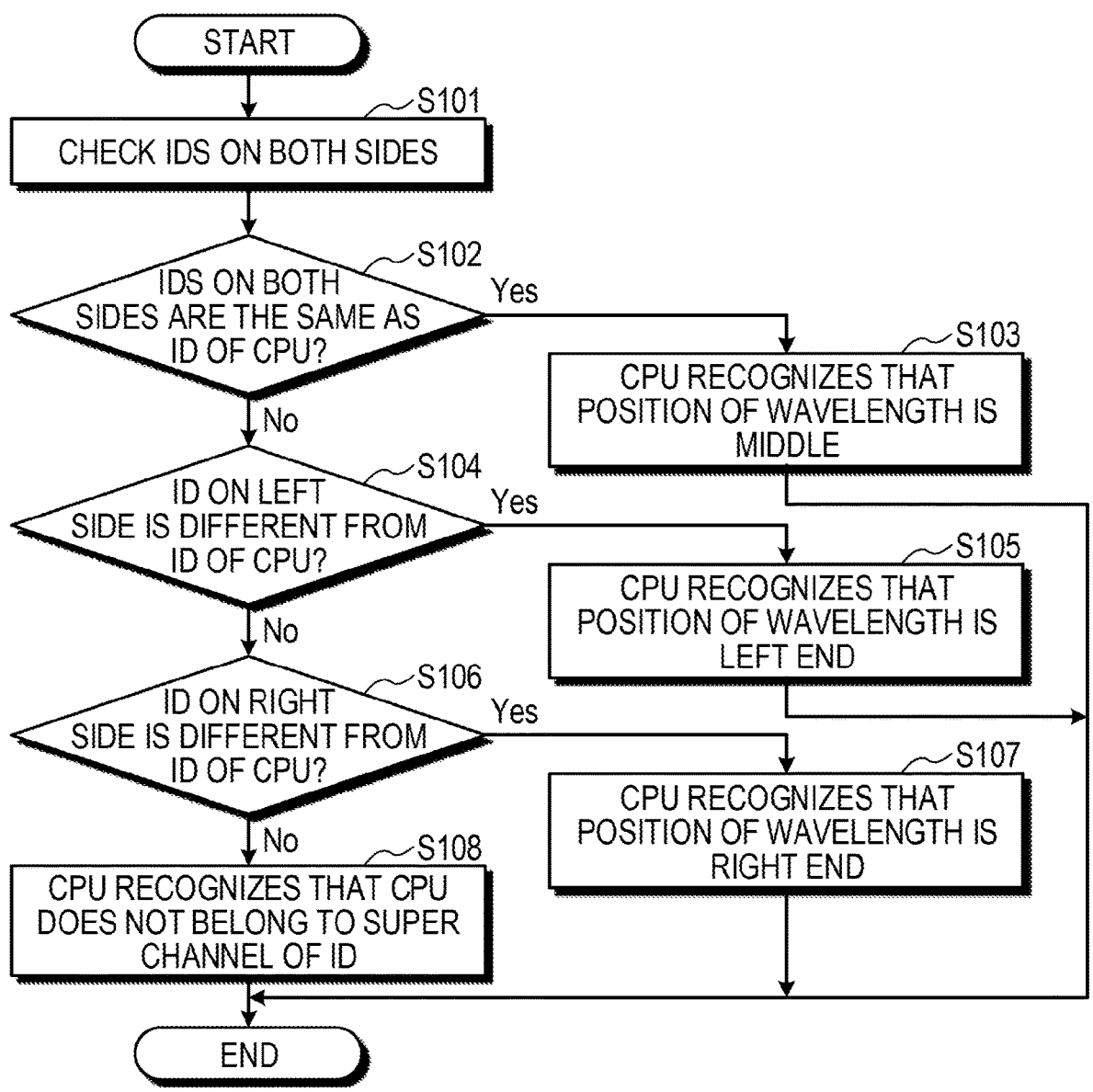
FIG. 19 is a flowchart illustrating an operation of the optical transmission system according to the sixth embodiment.

FIG. 19 is a flowchart illustrating an operation of the optical transmission system 1 according to the sixth embodiment. A CPU 19 of the receiving device 10 first checks the IDs of both sides (operation S101).

Next, the CPU 19 of the receiving device 10 determines whether the IDs on both sides are the same as an ID of the CPU 19 (operation S102). As a result of the determination, when the IDs on both sides are the same as the ID of the CPU 19 ("Yes" in operation S102), the CPU 19 of the receiving device 10 recognizes that the wavelength of the CPU 19 itself is positioned in the middle (operation S103).

As a result of the determination, when the IDs on both sides are not the same as the ID of the CPU 19 itself ("No" in operation S102), the CPU 19 of the receiving device 10 determines whether the ID on the left side between the IDs on both sides is different from the ID of the CPU 19 itself (operation S104). As a result of the determination, when the ID on the left side is different from the ID of the CPU 19 itself ("Yes" in operation S104), the CPU 19 of the receiving device 10 recognizes that the wavelength of the CPU 19 itself is positioned in the left end (operation S105).

As a result of the determination, when the ID on the left side is the same as the ID of the CPU 19 itself ("No" in operation S104), the CPU 19 of the receiving device 10 determines whether the ID on the right side between the IDs on both sides is different from the ID of the CPU 19 itself (operation S106). As a result of the determination, when the ID on the right side is different from the ID of the CPU 19 itself ("Yes" in operation S106), the CPU 19 of the receiving device 10 recognizes that the wavelength of the CPU 19 itself is positioned in the right end (operation S107).

When a result of the determination does not correspond to any one of operations S102, S104, and S106 ("No" in operation S106), the CPU 19 of the receiving device 10 recognizes that the ID of the CPU 19 itself does not belong to a super channel of the group ID (operation S108).

Accordingly, the optical transmission system 1 of the sixth embodiment may confirm whether the target wavelength belongs to the super channel of the group ID, and when the target wavelength belongs to the super channel of the group ID, the optical transmission system 1 may recognize a relative position within the super channel of the group ID.

In the first to sixth embodiments, the FSK signal is superimposed on each of the target wavelength, the first adjacent wavelength adjacent to the target wavelength, and the second adjacent wavelength adjacent to the target wavelength. However, the wavelength setting command is superimposed on the FSK signals, and the receiving device 10 may set a wavelength of the receiving device 10 based on the wavelength setting command transmitted by a command relay scheme. An embodiment of this case will be described below as a seventh embodiment.

Seventh Embodiment

Figure 20:
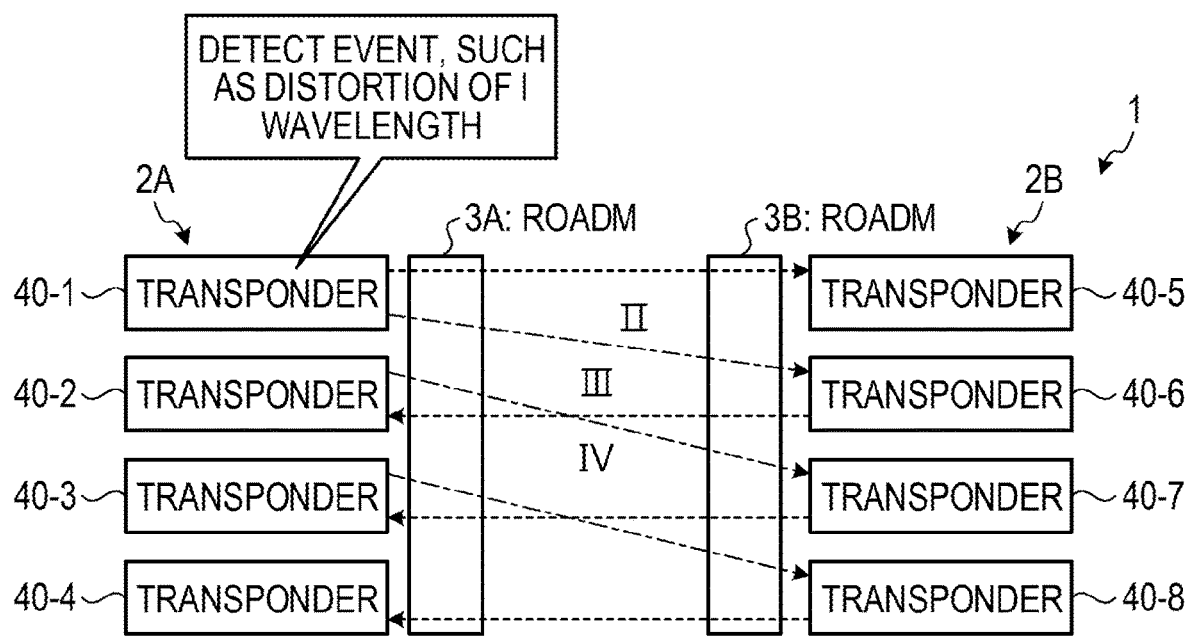
FIG. 20 is an explanatory diagram illustrating an example of an optical transmission system according to a seventh embodiment.

FIG. 20 is an explanatory diagram illustrating an example of an optical transmission system 1 according to a seventh embodiment. For example, among a plurality of transponders 40 of optical transmitting devices 2A and 2B, four transponders 40 of the optical transmitting device 2A are indicated by transponders 40-1 to 40-4, and four transponders 40 of the optical transmitting device 2B are indicated by transponders 40-5 to 40-8. Further, the transponders 40-1 to 40-4 face the transponders 40-5 to 40-8, respectively. Herein, in order to simplify the description, it is assumed that the wavelengths of the transponders 40-1 to 40-8 are changed. In the optical transmission system 1 of the seventh embodiment, the receiving devices 10 of the transponders 40-1 to 40-8 set the wavelengths of the receiving devices 10 by using a command relay scheme.

For example, a CPU 60 of a transmitting device 50 of the transponder 40-1 detects a necessity of a wavelength change (event generation) by a distortion of a wavelength and the like (see I of FIG. 20).

Next, the CPU 60 of the transmitting device 50 of the transponder 40-1 superimposes the wavelength setting command for changing the wavelength of the transponder 40-5 on an FSK signal of a target wavelength, and transmits the wavelength setting command to the transponder 40-5. Simultaneously, the CPU 60 of the transmitting device 50 of the transponder 40-1 superimposes the wavelength setting command for changing wavelengths of the transponders 40-2 to 40-4, and 40-6 to 40-8 on an FSK signal of an adjacent wavelength (e.g., a second adjacent wavelength) adjacent to the target wavelength, and transmits the wavelength setting command to the transponder 40-6 (see II of FIG. 20). In this case, the CPUs 19 of the receiving devices 10 of the transponders 40-5 and 40-6 set the wavelengths of the CPUs 19 based on the wavelength setting command.

Next, the CPU 60 of the transmitting device 50 of the transponder 40-6 superimposes the wavelength setting command for changing the wavelengths of the transponders 40-2 to 40-4, 40-7, and 40-8 on an FSK signal of a target wavelength, and transmits the wavelength setting command to the transponder 40-2 (see III of FIG. 20). In this case, the CPU 19 of the receiving device 10 of the transponder 40-2 sets the wavelength of the CPU 19 based on the wavelength setting command.

Next, the CPU 60 of the transmitting device 50 of the transponder 40-2 superimposes the wavelength setting command for changing the wavelengths of the transponders 40-3, 40-4, 40-7, and 40-8 on the FSK signal of the adjacent wavelength (e.g., the second adjacent wavelength) adjacent to the target wavelength, and transmits the wavelength setting command to the transponder 40-7 (see IV of FIG. 20). In this case, the CPU 19 of the receiving device 10 of the transponder 40-7 sets the wavelength of the CPU 19 based on the wavelength setting command.

Next, in the same way, the CPU 60 of the transmitting device 50 of the transponder 40-7 superimposes the wavelength setting command for changing the wavelengths of the transponders 40-3, 40-4, and 40-8 on the FSK signal of the target wavelength, and transmits the wavelength setting command to the transponder 40-3. In this case, the CPU 19 of the receiving device 10 of the transponder 40-3 sets the wavelength of the CPU 19 based on the wavelength setting command.

The CPU 60 of the transmitting device 50 of the transponder 40-3 superimposes the wavelength setting command for changing wavelengths of the transponders 40-4 and 40-8 on the FSK signal of the adjacent wavelength (e.g., the second adjacent wavelength) adjacent to the target wavelength, and transmits the wavelength setting command to the transponder 40-8. In this case, the CPU 19 of the receiving device 10 of the transponder 40-8 sets the wavelength of the CPU 19 based on the wavelength setting command.

The CPU 60 of the transmitting device 50 of the transponder 40-8 superimposes the wavelength setting command for changing the wavelength of the transponder 40-4 on the FSK signal of the target wavelength and transmits the wavelength setting command to the transponder 40-4. In this case, the CPU 19 of the receiving device 10 of the transponder 40-4 sets the wavelength of the CPU 19 based on the wavelength setting command.

A method in which the wavelength setting command is transmitted in an order of the transponders 40-1, 40-5, 40-2, 40-6, 40-3, 40-7, 40-4, and 40-8 may be conceived. Further, a method in which the wavelength setting command is transmitted from the middle transponder, such as the transponder 40-4 or the transponder 40-5, not from the end transponder, so that the wavelength setting command is transmitted from the transponder 40-1 may be conceived.

Accordingly, when the wavelength of each transponder 40 is changed, the optical transmission system 1 of the seventh embodiment may set the wavelength of each transponder 40 by instructing by the wavelength setting command.

The modulation scheme in the FSK-SV scheme has been described, but the optical transmission system 1 of the present embodiment is also applicable to an ASK scheme (M. D. Feuer and V. A. Vaishampayan, "Rejection of Inter-label Crosstalk in a Digital Lightpath Labeling System With Low-Cost All-Wavelength Receivers" IEEE J. Lightwave Technol., vol. 24, pp. 1121-1128(2006)).

The optical transmission system 1 of the present embodiment is also applicable to a polarization method (M. D. Feuer et al., "Digital Lightpath Label Transcoding for Dual-Polarization QPSK System," in OFC/NFOEC 2011, JWA28 (2011)).

Each constituent element of each illustrated unit does not need to be configured as the physical illustration thereof. That is, a particular form of the distribution and the combination of the respective units is not limited to the illustration, and the entirety or a part of the units may be configured to be functionally or physically distributed and/or combined on the predetermined unit basis according to various loads, a usage situation, and the like.

The entirety or a predetermined part of various processing functions performed by each device may be executed in the CPU (or a microcomputer, such as a micro processing unit (MPU) and a micro controller unit (MCU)). Further, it is a matter of course that the entirety or a predetermined part of the various processing functions may be executed in a program interpreted and executed by the CPU (or the microcomputer, such as an MPU and an MCU) or hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A reception device, comprising:
    a receiver configured to receive a wavelength-multiplexed optical signal so as to generate an electrical signal of the wavelength-multiplexed optical signal; and
    a digital signal processor configured to include a plurality of electrical filters,
    the plurality of electrical filters including a first electrical filter, a second electrical filter and a third electrical,
    the first electrical filter configured to filter a first portion of the electrical signal corresponding to a specific wavelength of the wavelength-multiplexed optical signal,
    the second electrical filter configured to filter a second portion of the electrical signal that corresponds to only a portion of a first adjacent wavelength of the wavelength-multiplexed optical signal that is adjacent to the specific wavelength from the wavelength-multiplexed optical signal,
    the third electrical filter configured to filter a third portion of the electrical signal corresponding to a third portion of the electrical signal that corresponds to only a portion of a second adjacent wavelength of the wavelength-multiplexed optical signal that is opposite the first adjacent wavelength and adjacent to the specific wavelength,
    a bandwidth of the first electrical filter is greater than a bandwidth of the second electrical filter and a bandwidth of the third electrical filter,
    the digital signal processor
        analyzes outputs of the first electrical filter, the second electrical filter and the third electrical filter to obtain identification numbers of a superchannel including the specific wavelength, the first adjacent wavelength, and the second adjacent wavelength,
        compares the obtained identification numbers, and
        recognizes a position within the superchannel of the specific wavelength based on the comparison of the identification numbers.

2. The reception device according to claim 1, wherein a frequency shift keying-supervisory (FSK-SV) scheme is used as a modulation scheme of the electrical signal.

3. The reception device according to claim 1,
    wherein the output of the second electric filter is a first supervisory control signal and the output of the third electrical filter is a second supervisory control signal.

4. The reception device according to claim 3, wherein the digital signal processor is further configured to:
    offset the output of the second electrical filter and the output of the third electrical filter;
    perform a down-sampling on the output of the second electrical filter and the output of the third electrical filter; and
    detect an identification number of the first supervisory control signal and an identification number of the second supervisory control signal after the down-sampling is performed.

5. The reception device according to claim 4, wherein the processor is further configured to:
    detect each of the first supervisory control signal and the second supervisory control signal by monitoring offset frequency or a signal intensity of the output of the second electrical filter and the output of the third electrical filter.

6. The reception device according to claim 3, wherein a wavelength setting command is superimposed on the first supervisory control signal and the second supervisory control signal, and
    wherein the processor is further configured to set the specific wavelength, based on the wavelength setting command transmitted by a command relay scheme.

7. A method of detecting a supervisory control signal, the method comprising:
    receiving a wavelength-multiplexed optical signal so as to generate an electrical signal of the wavelength-multiplexed signal, by a receiver;
    filtering with a digital signal processor including a plurality of electrical filters including a first electrical filter, a second electrical filter and a third electrical filter, the filtering including
        first filtering with the first electrical filter a first portion of the electrical signal corresponding to
        a specific wavelength of the wavelength-multiplexed optical signal,
        second filtering with a second electrical filter a second and only a portion of the electrical signal that corresponds to only a portion of a first of adjacent wavelength of the wavelength-multiplexed optical signal that is adjacent to the specific wavelength from the wavelength-multiplexed optical signal,
        third filtering with a third electrical filter a third portion of the electrical signal corresponding to a third portion of the electrical signal that corresponds to only a portion of a second adjacent wavelength of the wavelength-multiplexed optical signal that is opposite the first adjacent wavelength and adjacent to the specific wavelength,
  a bandwidth of the first electrical filter is greater than a bandwidth of the second electrical filter and a bandwidth of the third electrical filter;
analyzing outputs of the first electrical filter, the second electrical filter and the third electrical filter to obtain identification numbers of a superchannel including the specific wavelength, the first adjacent wavelength, and the second adjacent wavelength,
comparing the obtained identification numbers; and
recognizing a position within the superchannel of the specific wavelength based on the comparison of the identification numbers.

* * * * *